United States Patent

Comella

[15] 3,652,804

[45] Mar. 28, 1972

[54] MAINTENANCE BUSY LINK MAP MARKING IN A STORED PROGRAM CONTROLLED SWITCHING SYSTEM

[72] Inventor: William K. Comella, Holmdel, N.J.

[73] Assignee: Bell Telephone Laboratories, Incorporated, Murray Hill, N.J.

[22] Filed: Oct. 24, 1969

[21] Appl. No.: 869,122

[52] U.S. Cl. ..................179/18 ES, 179/175.2 R, 340/172.5

[51] Int. Cl. ..........................................................H04q 3/54

[58] Field of Search.....................179/18 ES, 175.2, 175.2 C; 340/172.5

[56] References Cited

UNITED STATES PATENTS 3,495,220 2/1970 Lawson et al.......................240/172.5

*Primary Examiner*—Kathleen H. Claffy
*Assistant Examiner*—Thomas W. Brown
*Attorney*—R. J. Guenther and James Warren Falk

[57] ABSTRACT

A stored program processor controlled switching system is disclosed wherein links of the switching network are busied for both maintenance and communication purposes. The busy or idle state of a link is recorded in a processor link map. A separate maintenance map records the particular links which are busy for maintenance purposes. When a link is made maintenance busy, a link map work defining a link group containing that link is marked with an index to a maintenance map word which contains information as to which link of the link group is maintenance busy. An audit program periodically checks the link map with the actual communication paths through the network and is directed to the proper maintenance map word so that it can reconcile discrepancies between the link map and the communication paths through the network.

12 Claims, 27 Drawing Figures

INVENTOR
W. K. COMELLA
BY Frederick W. Padden
ATTORNEY

MAINTENANCE BUSY LINK MAP MARKING IN A STORED PROGRAM CONTROLLED SWITCHING SYSTEM

BACKGROUND OF THE INVENTION

This invention relates to memory control facilities within a switching system and, more particularly, to arrangements for maintaining availability records of switching network links in the memory of a stored program controlled electronic switching system.

In a switching system, it is customary for control circuits to supervise the states, busy or idle, of all the links in the switching network so that paths comprising links are established through the network without disturbing existing connections. Prior art electromechanical switching systems accomplish supervision by placing electrical signals on the links of call communication paths to signify their busy-idle sttes. Such supervisory arrangements enable the control circuits to establish connections through the network only over those links not already part of the path.

With the advent of electronic switching systems controlled by stored program processors, new techniques were developed for supervising the busy-idle states of the links in the switching network. A widely used technique is to set aside a memory area in the processor for recording busy-idle data signifying the availability of all the links in the switching network. Illustratively, such links of the network are assigned addressable binary bits in the memory area and the processor in serving a call determines the present state of a link by examining the binary information of the assigned bit. This area is referred to as the "link map" and is constantly updated so that it accurately reflects the instantaneous availability of the links in the switching network.

Occasionally, maintenance personnel responsible for the proper operation of the system will request the processor to reserve certain links in the network for the performance of various tests. In such a circumstance, the processor changes the recorded status of those links in the link map from idle to busy so that no nonmaintenance connections will be set up over those links in the network until the maintenance personnel indicate that they again be made available for communication connections.

Since the processor depends upon the accuracy of the information stored in the link map when it attempts to set up connections through the switching network, the link map is periodically checked to insure that it does indeed reflect the status of the links in the network. Checking is performed by an audit program in the processor. The audit program compares data pertaining to the commmunication paths in the network, as recorded in an area of the processor memory called the network path memory, with availability data reflecting the states of the links, as recorded in the link map. As was mentioned above, the processor may have reserved certain links for maintenance purposes by changing their recorded status in the link map. If this has occurred, the audit program recognizes a discrepancy between the network path memory and the link map. In the prior art, some means is generally provided for resolving the discrepancy by indicating to the audit program when a link is maintenance busy.

Priorly, various methods have been implemented for indicating to the audit program the maintenance busy status of a link. For example, it has been a practice to provide a separate processor table containing a list of all maintenance busy links. A composite map is formed by the audit program from the network path memory and the maintenance busy list. The audit program compares this composite map with the link map and discrepancies are ascertained and corrected. A problem which results from this use of a separate maintenance busy list and the formation of a composite map from two independent lists is the consumption of large amounts of processing time as well as the utilization of valuable and limited memory space. In a switching system, as in all real-time processing systems, this large time consumption and memory utilization is unsatisfactory.

It is therefore apparent that a need exists for an arrangement whereby a record of maintenance busy links may be kept while allowing the audit program to check the link busy-idle data without requiring an inordinate amount of time and memory.

SUMMARY OF THE INVENTION

In accordance with principles illustrative of this invention, I advantageously achieve, in a system having circuit elements selectively available for service tasks, efficient procedures and reductions in the amount of processor time and memory needed to resolve discrepancies between a first memory area storing availability data for the elements and the actual service states of those elements. A second memory area is provided to store data as to which of those elements are reserved for a particular nonservice task such as a maintenance test. When an element is reserved for the particular task, the first memory area is marked with a busy indication for the element and an index of a location in the second memory area storing the particular task reservation data for the element. Thus, when the data in the first memory area is periodically audited and a discrepancy involving a certain element is ascertained, the audit is directed to the location in the second memory area storing the particular nonservice task reservation data for that certain element.

A specific illustrative embodiment relates to an arrangement that provides link map memory facilitates for storing availability data pertaining to links in a switching network and separate maintenance map memory facilitates for storing which links are maintenance busy. Bits in a link map are utilized to flag the audit program that links have been made maintenance busy. These bits in the link map also direct the audit program to the appropriate location in the maintenance map. The maintenance map, as contrasted with the link map, is not dedicated to particular links in the network, but rather is associated with different links at different times. In order to fully cross-index the maintenance map with the link map, bits in the maintenance map are used to store the address in the link map recording availability data for the maintenance busy links.

In the illustrative embodiment of this invention, the scratch pad memory of the processor is segmented into 20-bit words. In order to achieve efficient addressing of the link map, the illustrative network configuration requires the use of 16 bits per link map word for recording the states of a group of 16 links. The present invention advantageously utilizes the four remaining bits of each link map word to conserve processing time and still allow the audit program to reconcile discrepancies between the link map and the network path memory due to maintenance busy conditions of various links in the switching network.

In the scratch pad memory of the processor, a maintenance map area is set aside. When a request is received by the processor to busy a link for maintenance purposes, the state of that link as recorded in the link map is changed to reflect a busy condition, without regard to whether this is a communication or maintenance busy condition. The processor then sets a predetermined one of the four remaining unused bits in the link map word containing the bit assigned to that link. This predetermined bit is used as a flag to indicate to the audit program that one of the links whose state is recorded in that link map word has been made maintenance busy. The three remaining unused bits in the link map word are set by the processor to index the maintenance map and direct the audit program to one out of eight possible subdivisions, or "cells," of the maintenance map. The cells in the maintenance map are not dedicated to particular links in the switching network, but rather they are associated with different link map words at different times. Each of the cells of the maintenance map includes a word in which is recorded the maintenance busy states of the group of links whose states are recorded in the link map word with which the cell is associated at that time. In this cell word, the processor sets the bit in the position corresponding to the bit position in the link map word of the link which has been made maintenance busy. Also, in another word in the cell, the processor records the address of the associated link map word.

In the illustrative embodiment of this invention, the audit program forms link map words from the information in the network path memory and matches these words against the link map words in the link map. Thus, in accordance with this invention, when the audit program discovers a discrepancy between a formed link map word and the corresponding word in the link map, the audit program examines the flag bit of the link map word causing the discrepancy. If this bit is set, the audit program examines the three index bits of the link map word to determine which cell in the maintenance map is presently associated with this link map word. The audit program then takes the logical union of the maintenance map cell word and the link map word formed from the network path memory information. This union word is compared with the link map word causing the discrepancy. If the discrepancy no longer exists, the audit program knows that the discrepancy was caused by the particular link having been made maintenance busy. If the discrepancy still exists, the audit program corrects the link map word by replacing it with the union word.

To summarize, the above-described inventive results are attained by recording in the link map area of the memory busy data for a maintenance busy link, recording in the maintenance map area of the memory maintenance busy data for the maintenance busy link, recording in the link map the location in the maintenance map of the maintenance busy data, and recording in the maintenance map the location in the link map containing busy data for the maintenance busy link.

DESCRIPTION OF THE DRAWING 2 The foregoing inventive contributions are apparent by referring now to the drawing in which.

Figure 4A:
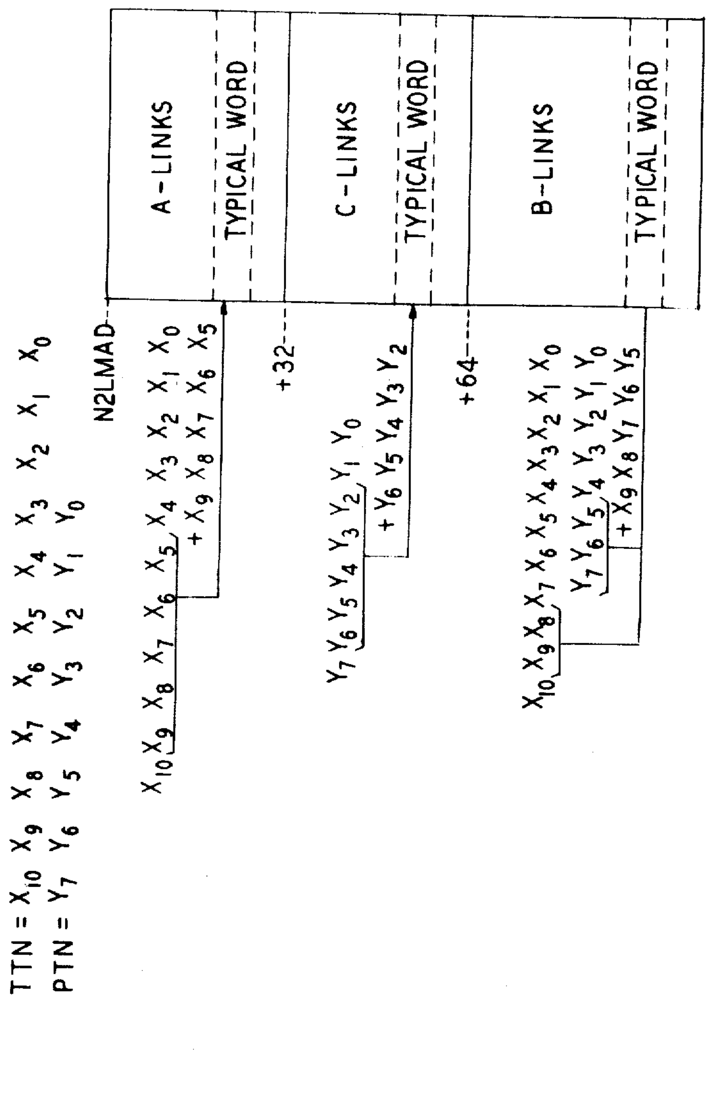
Figure 4B:
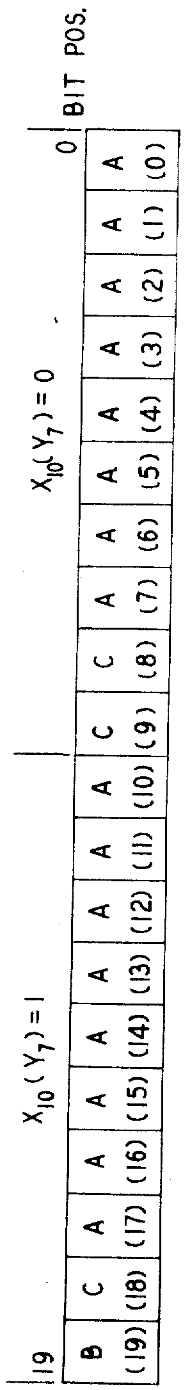
Figure 7C:
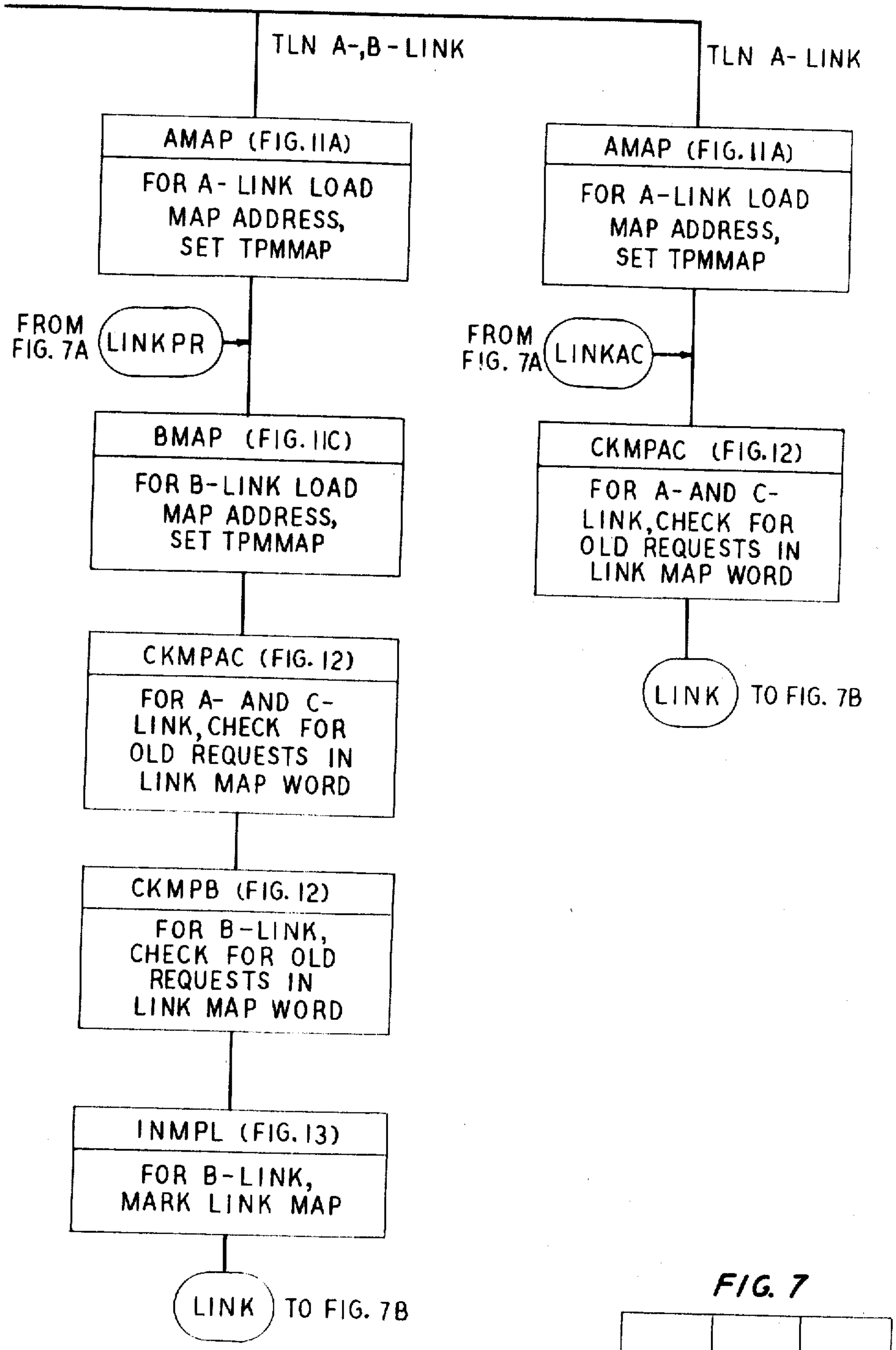
Figure 7:
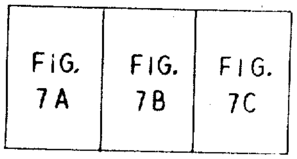
Figure 7A:
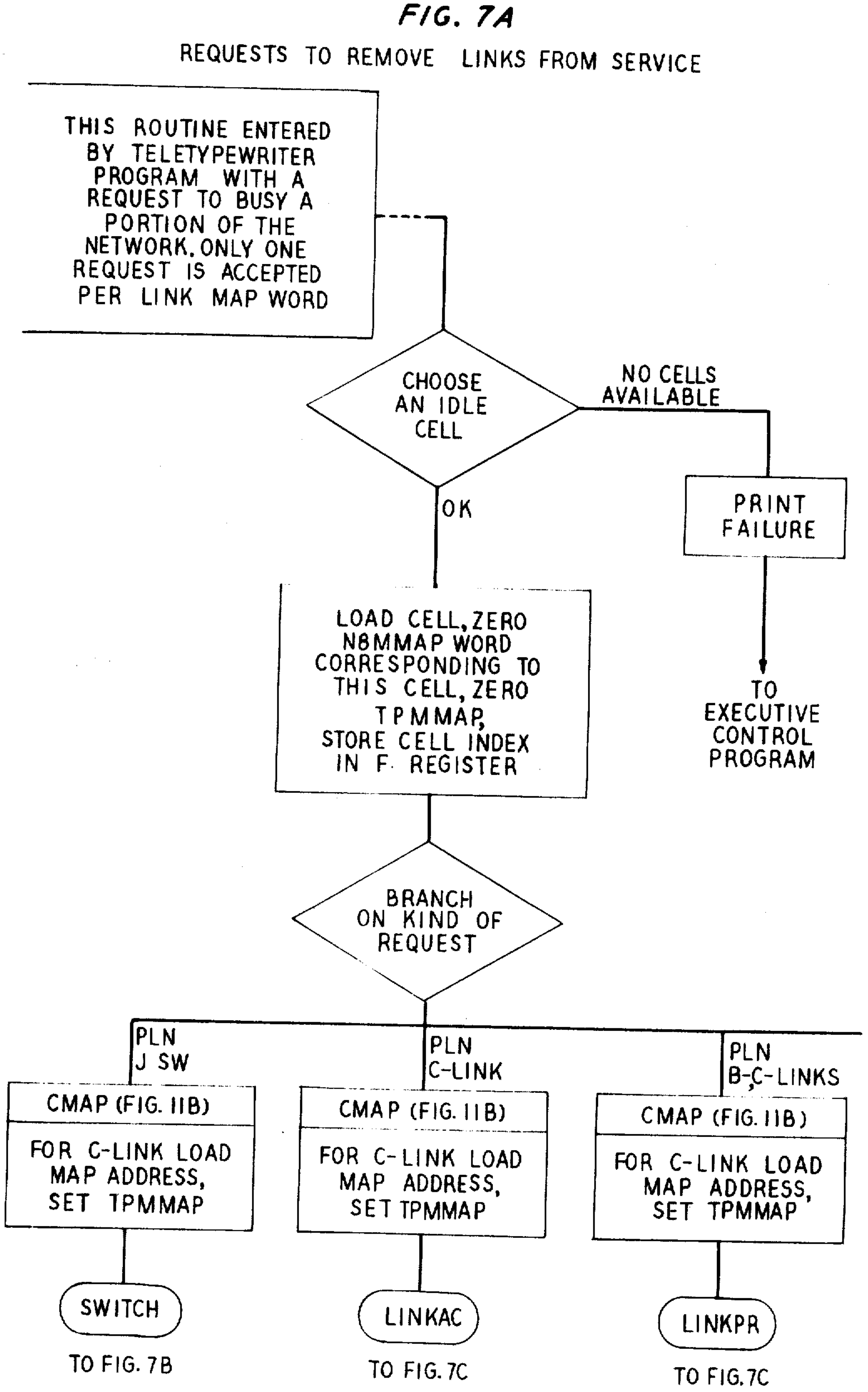
Figure 7B:
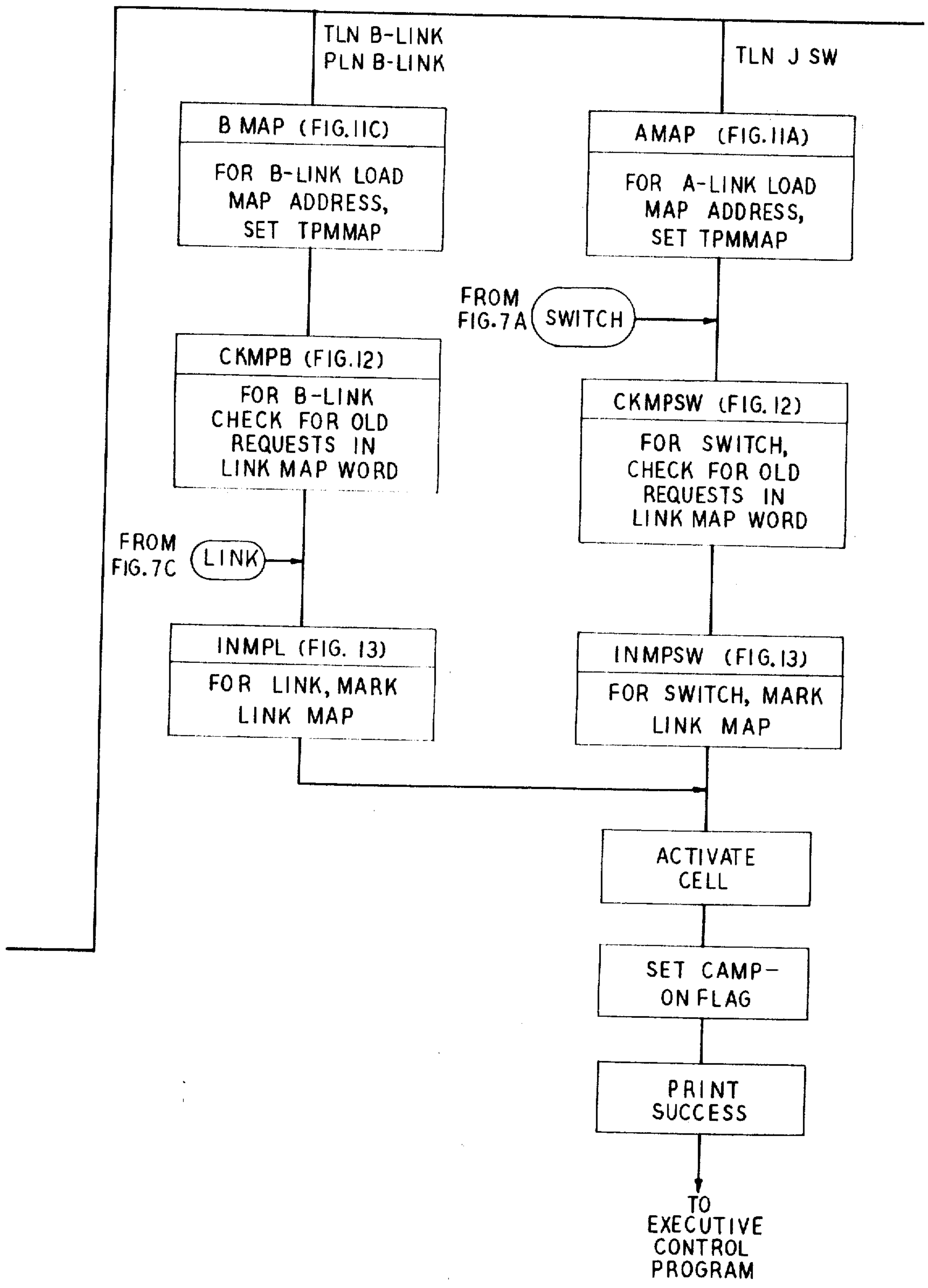
Figure 8:
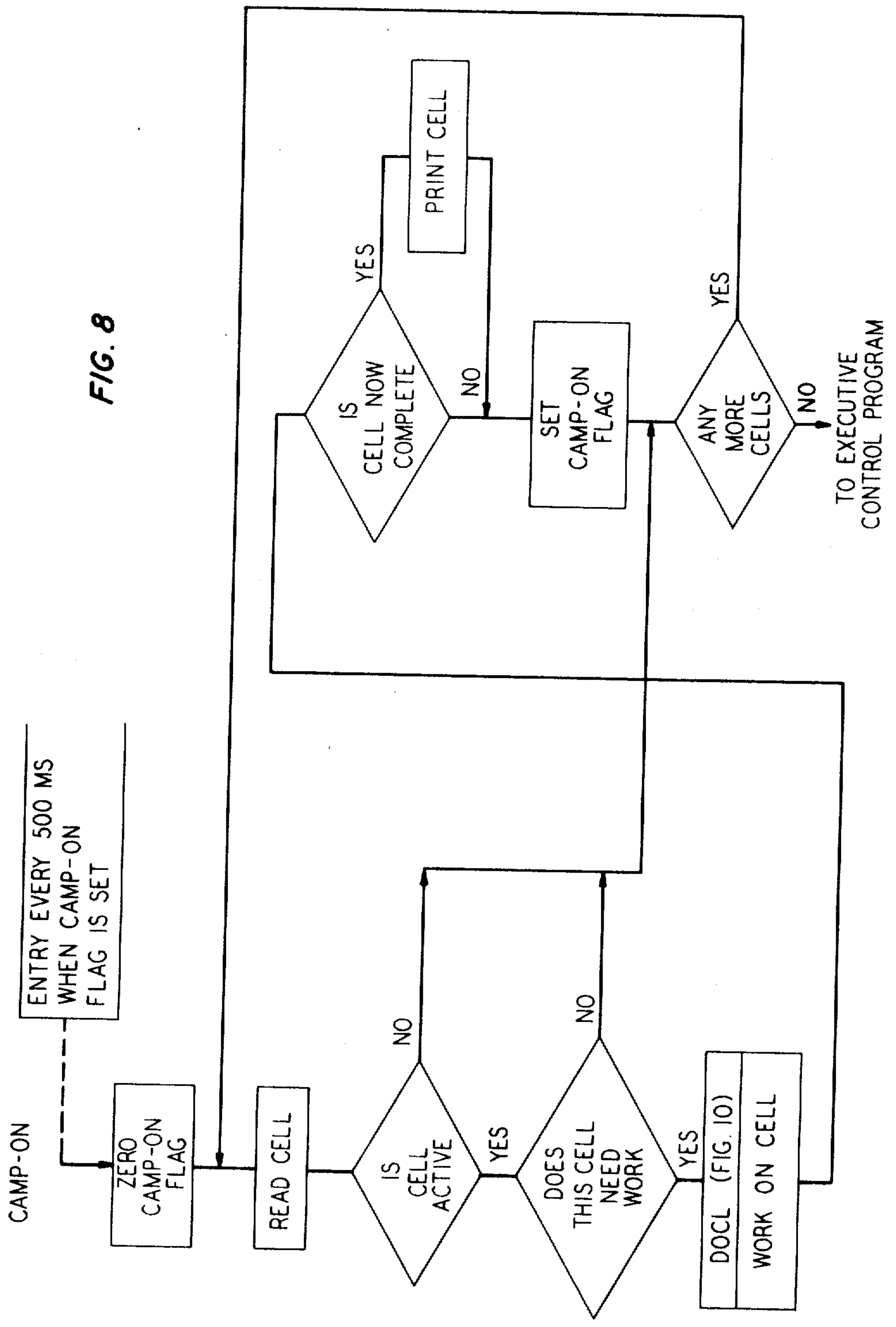
Figure 9:
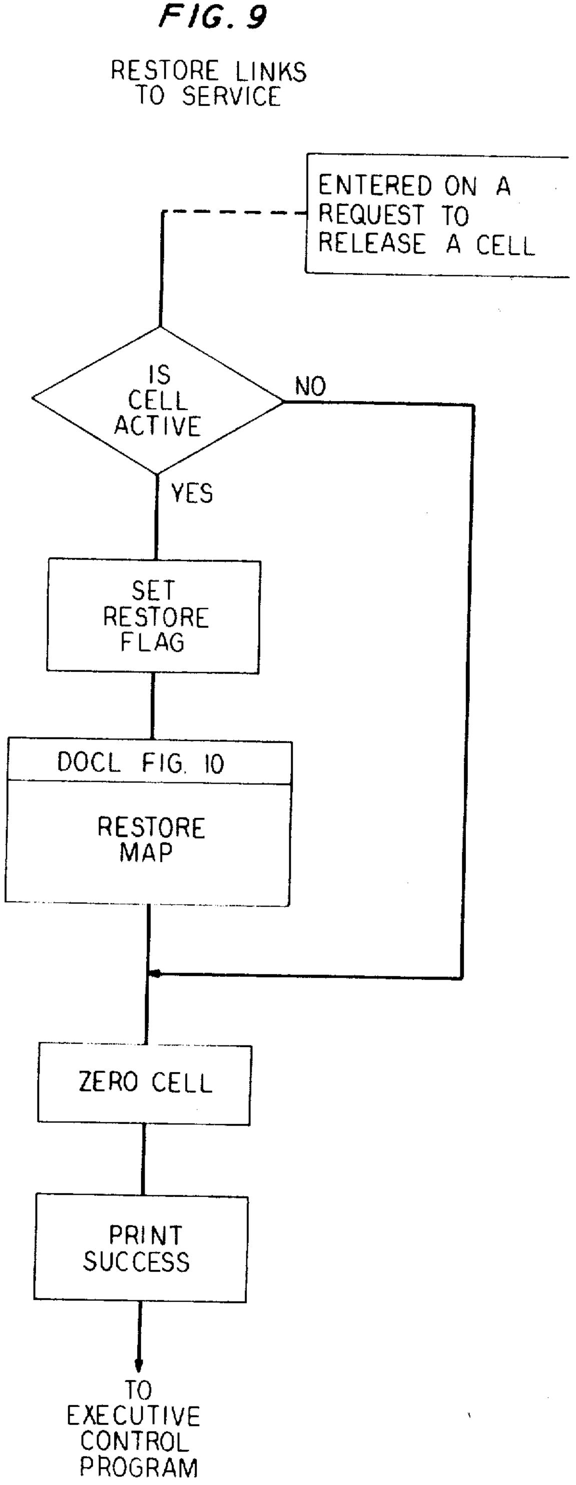
Figure 10C:
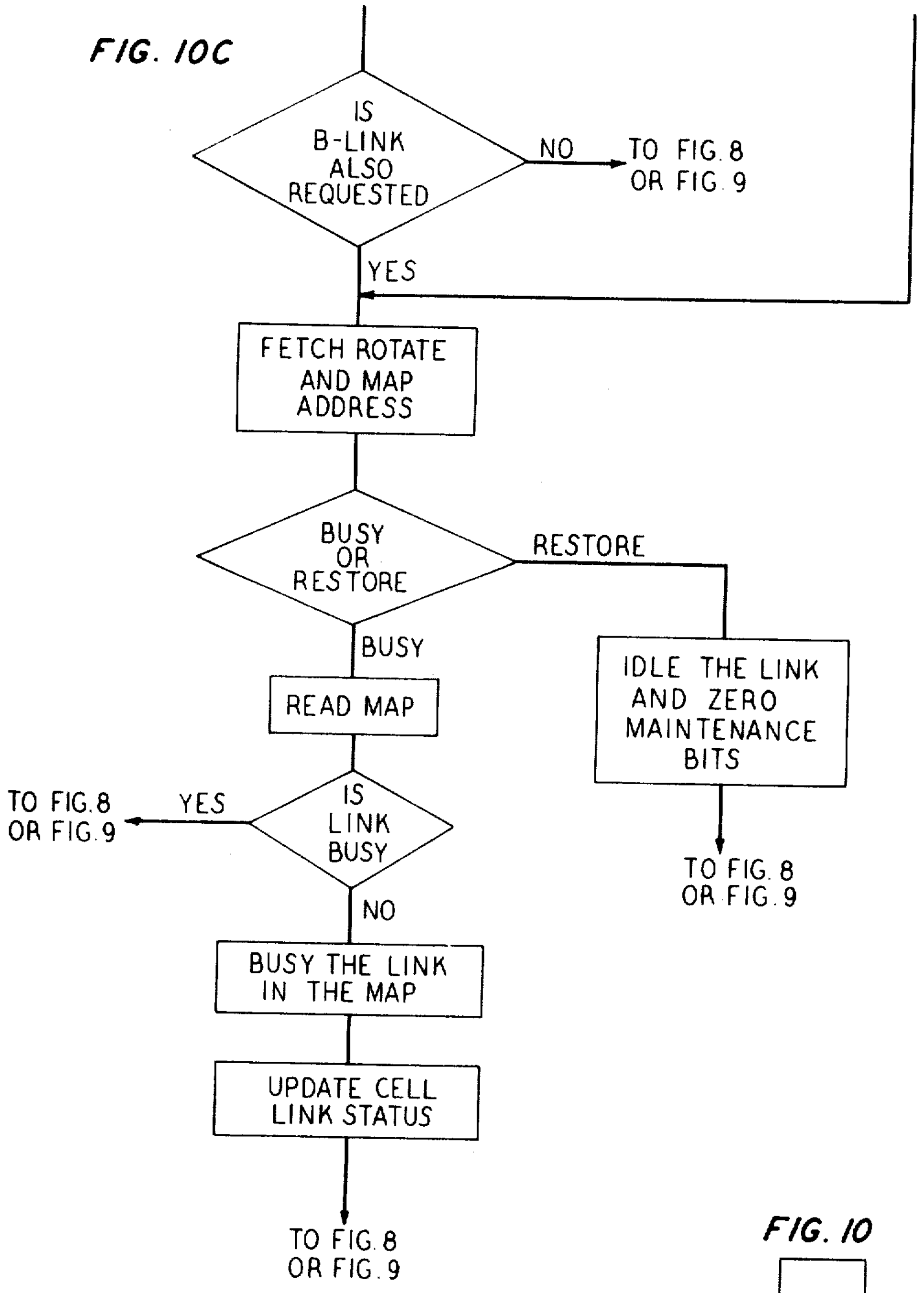
Figure 10:
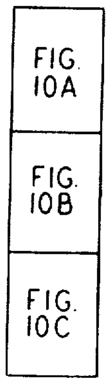
Figure 10A:
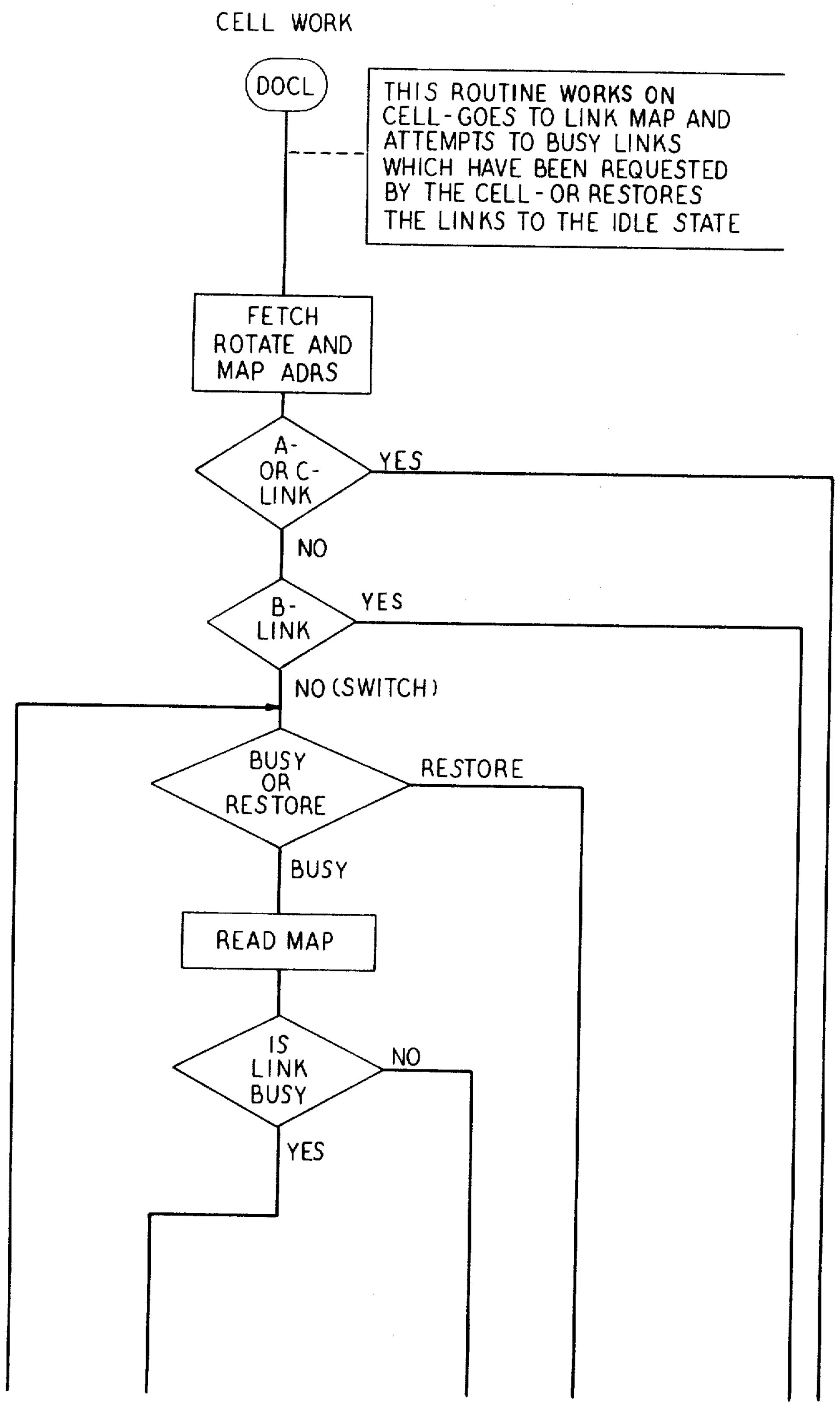
Figure 10B:
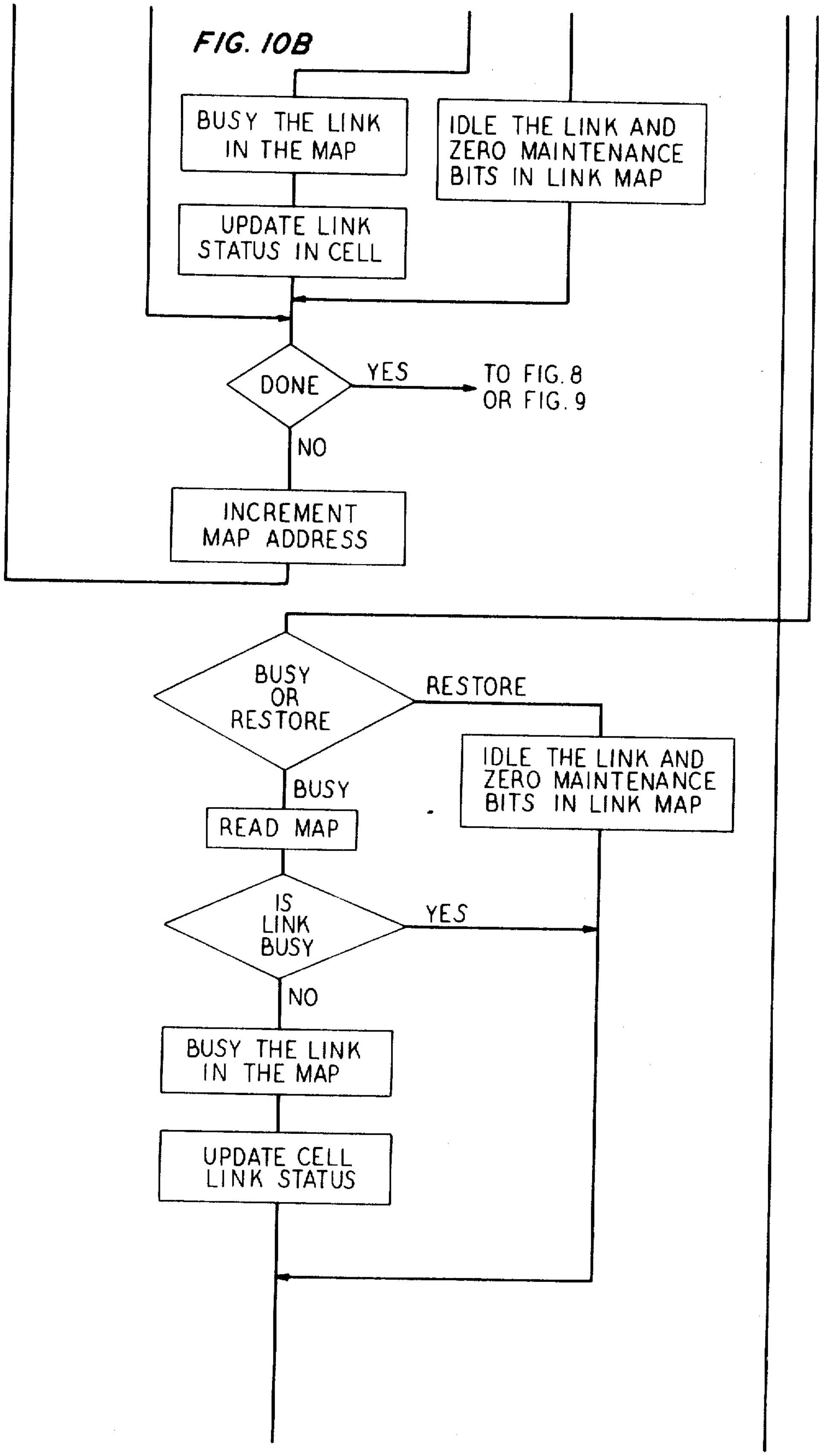
Figures 11, 11C:
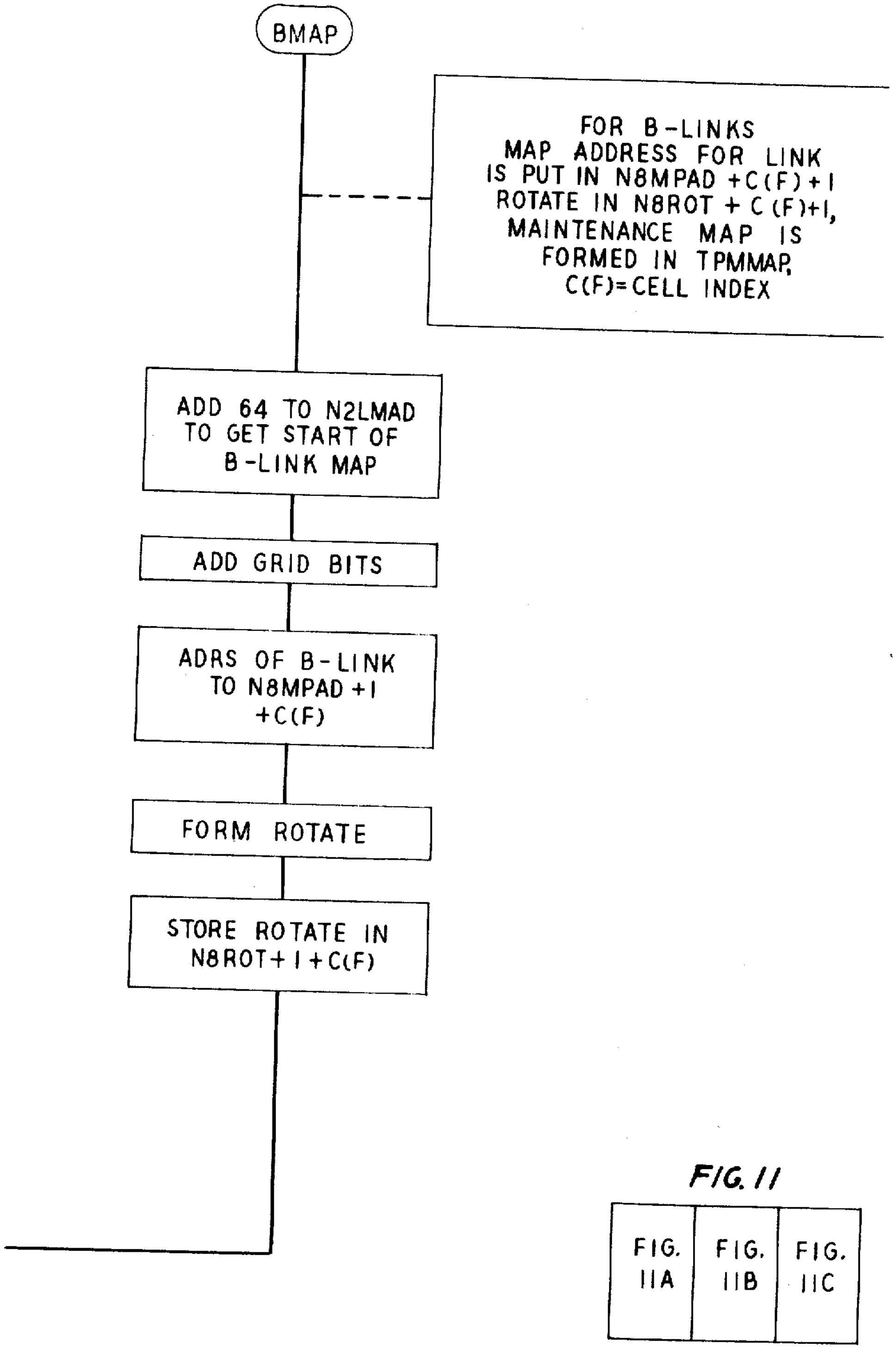
Figure 11A:
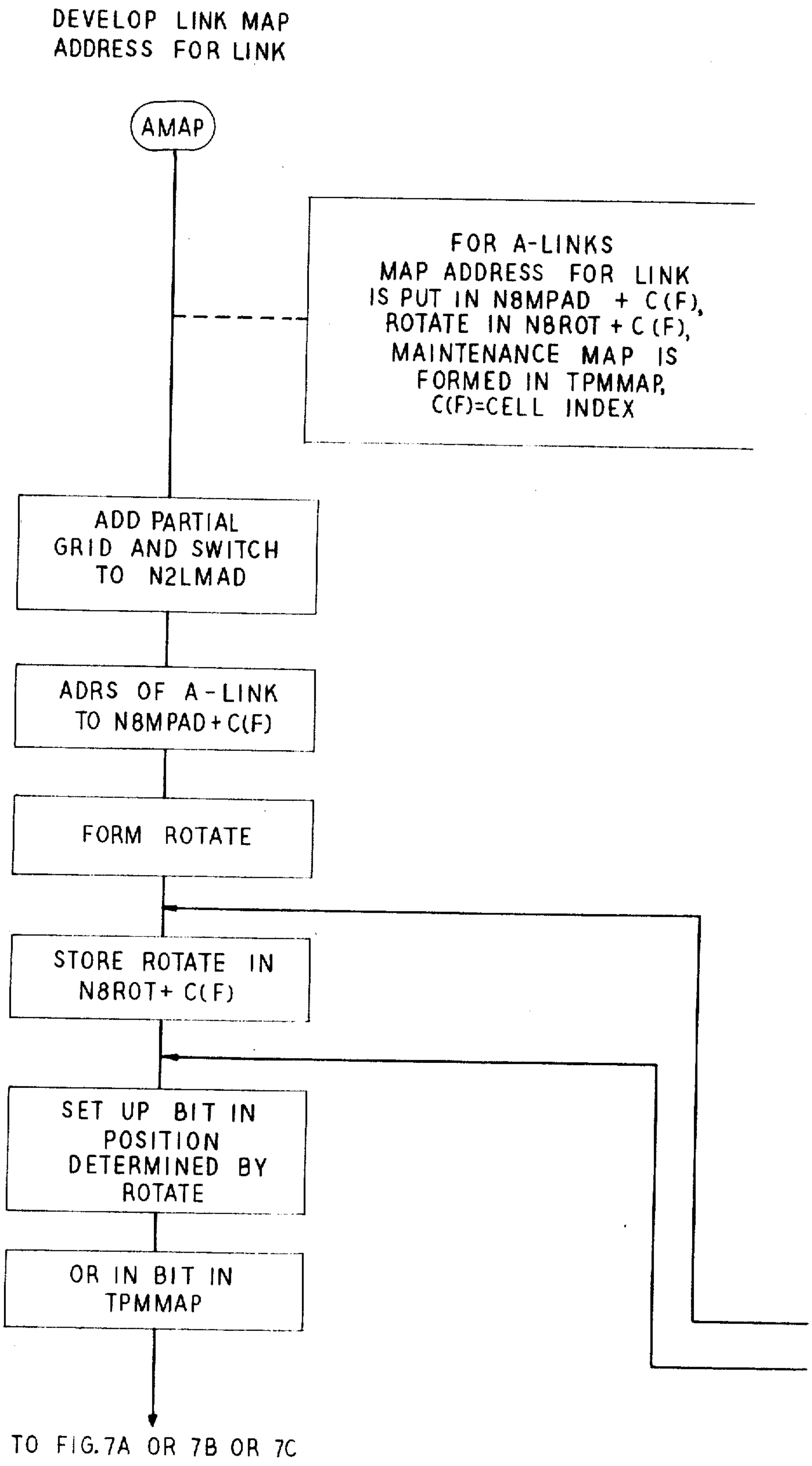
Figure 11B:
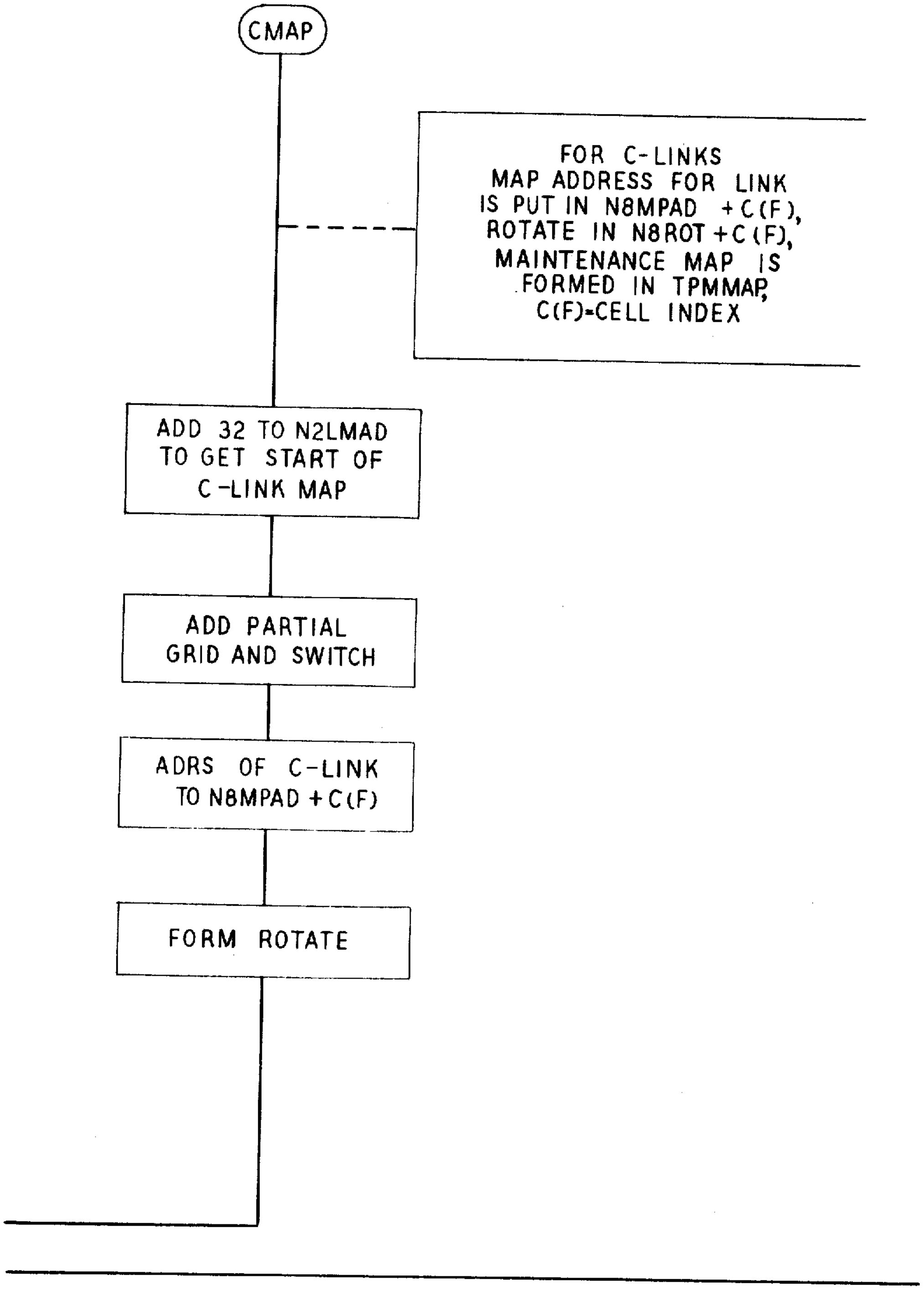
Figure 12:
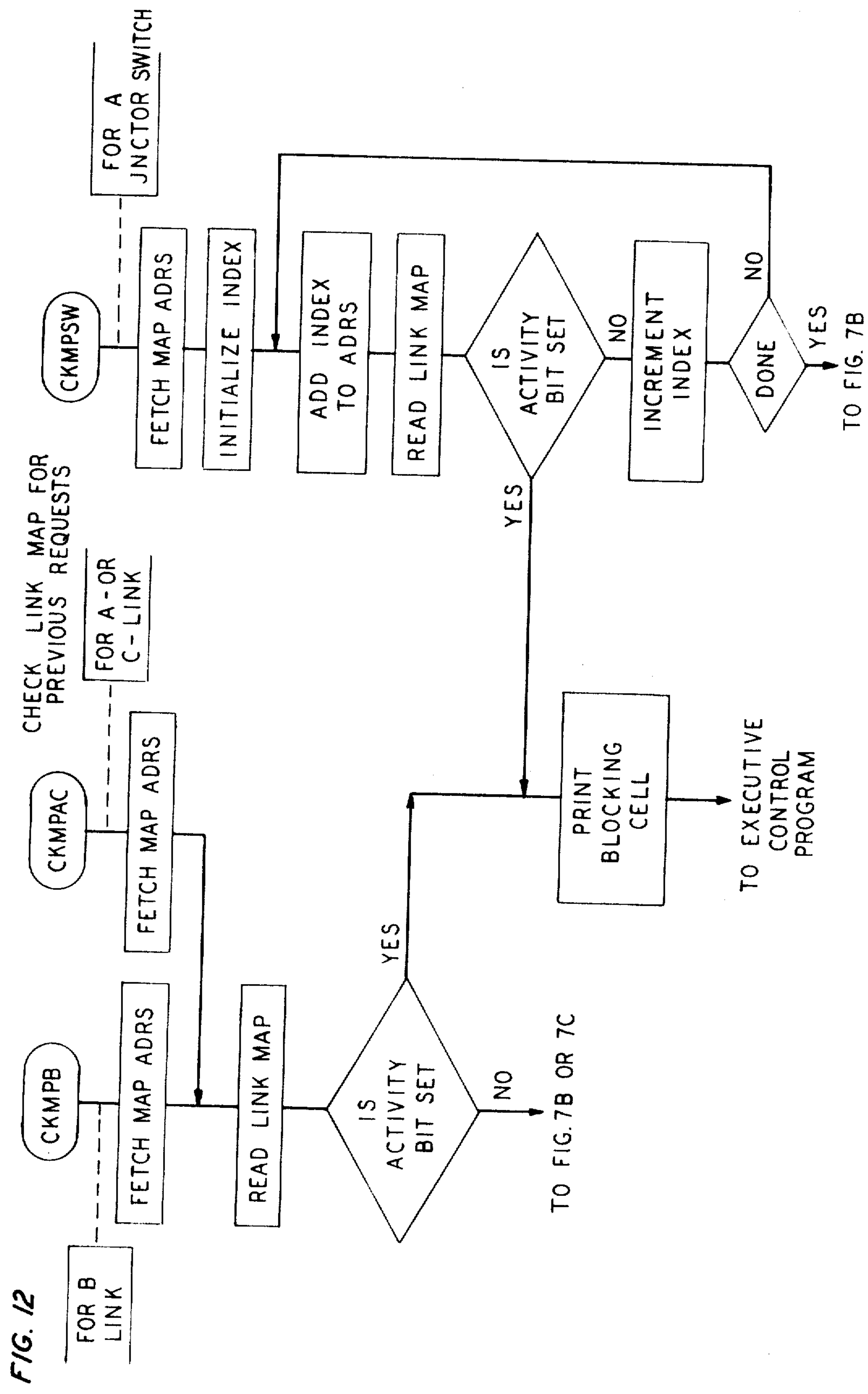
Figure 13:
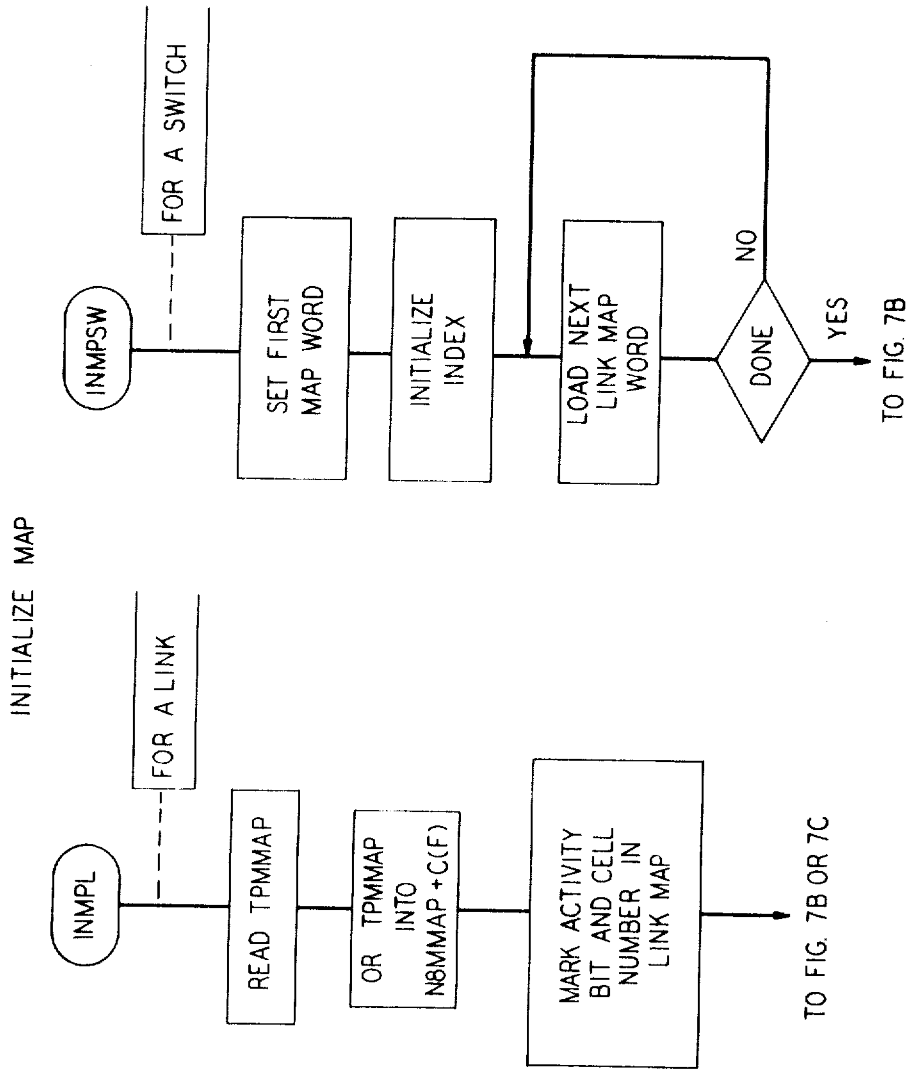

FIGS. 4A and 4B illustratively depict the addressing technique for and the layout of a typical word in the link map of the scratch pad memory of the processor;

FIGS. 5A through 5D show the layout of the various parts of the maintenance map in the scratch pad memory; 3 6 shows an overall functional flow chart of a program for controlling the operation of the processor to enter a maintenance request and mark the link and maintenance maps accordingly;

FIGS. 7A through 7C, when arranged as shown in FIG. 7, show a detailed flow chart of a program which causes the processor to remove a link from service for maintenance purposes;

FIG. 8 shows a detailed flow chart of a program which causes processor attempts to complete maintenance requests;

FIG. 9 shows a detailed flow chart of a program which causes the processor to return previously maintenance busied links to an idle condition so that they are again available for regular communication service;

FIGS. 10A through 10C, when arranged as shown in FIG. 10, show a flow chart of a program subroutine which causes the processor to mark the link and maintenance maps in accordance with make-busy or restore-to-service types of requests;

FIGS. 11A through 11C, when arranged as shown in FIG. 11, show a flow chart of a program subroutine which causes the processor to develop the link map address for a link in accordance with the addressing technique depicted in FIG. 4A;

FIG. 12 shows a flow chart of a program subroutine which causes the processor to check the link map for previous maintenance requests when attempting to remove a link from service; and FIG. 13 shows a flow chart of a program subroutine which causes the processor to initialize the link and maintenance map.

GENERAL DESCRIPTION

Figure 1:
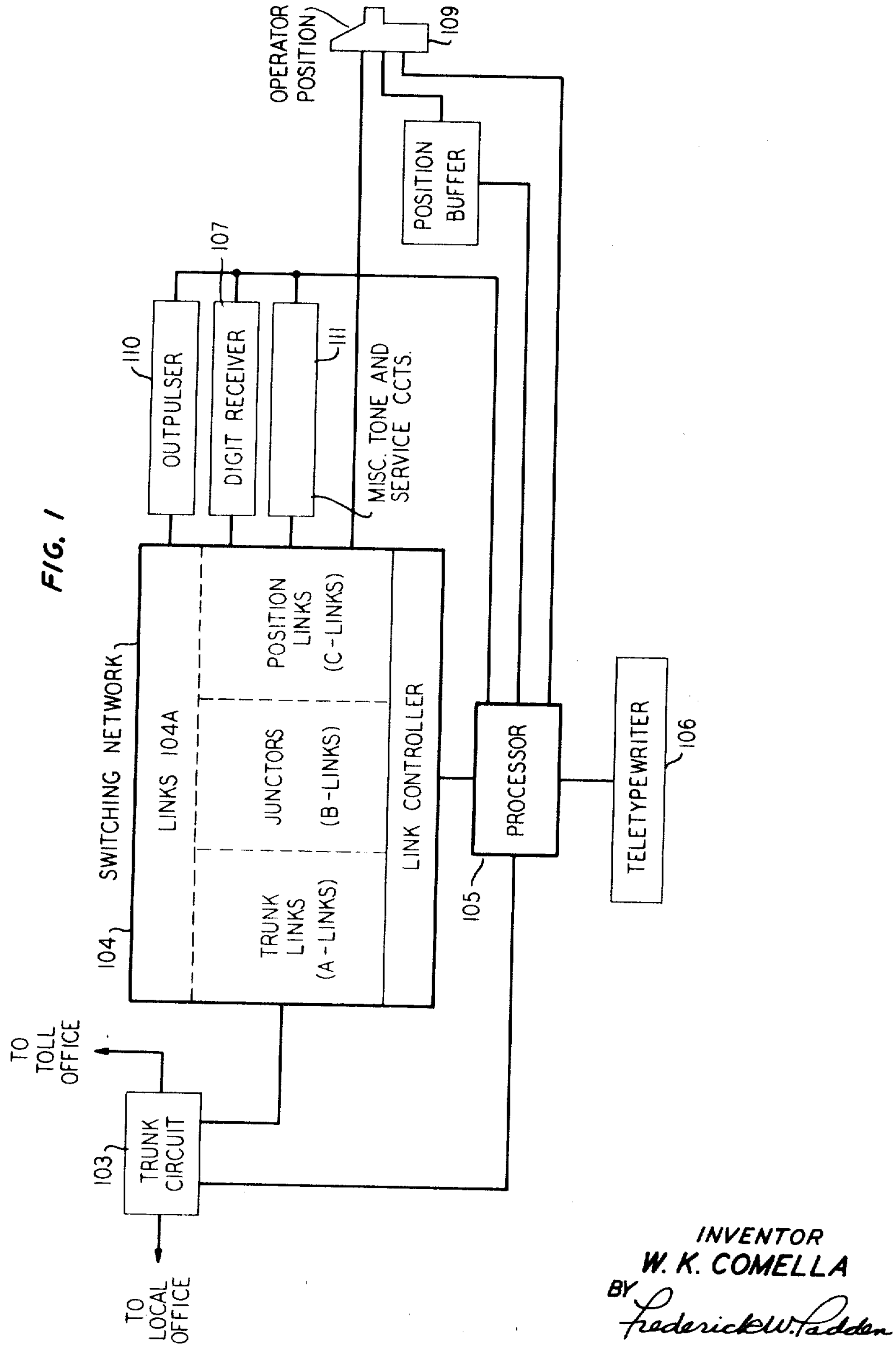
FIG. 1 shows a block diagram of an illustrative stored program controlled electronic switching system embodying features of the present invention.

In order to illustrate an application of the principles of the present invention, a stored program controlled electronic switching system which serves as an illustrative environment for this invention is depicted in FIG. 1. This system is responsive to a need for operator assistance on a toll call from a local office to a toll office via trunk circuit 103. Switching network 104, under the control of processor 105, connects the calling party at the local office to operator position 109, outpulser 110, digit receiver 107, and miscellaneous tone and service circuits 111, as required. Teletypewriter 106 is used by maintenance personnel to communicate with processor 105 whenever necessary in order to control the system for maintenance purposes. For a detailed description of this system, the reader is referred to the pending application of R. J. Jaeger, Jr. and A. E. Joel Jr., Ser. No. 519,787, filed Jan. 10, 1966, now U.S. Pat. No. 3,484,560, issued Dec. 16, 1969. The present invention is illustratively concerned with the manner in which records of the states of the A, B, and C-links 104A of switching network 104 are kept and checked for accuracy by processor 105.

Figure 2:
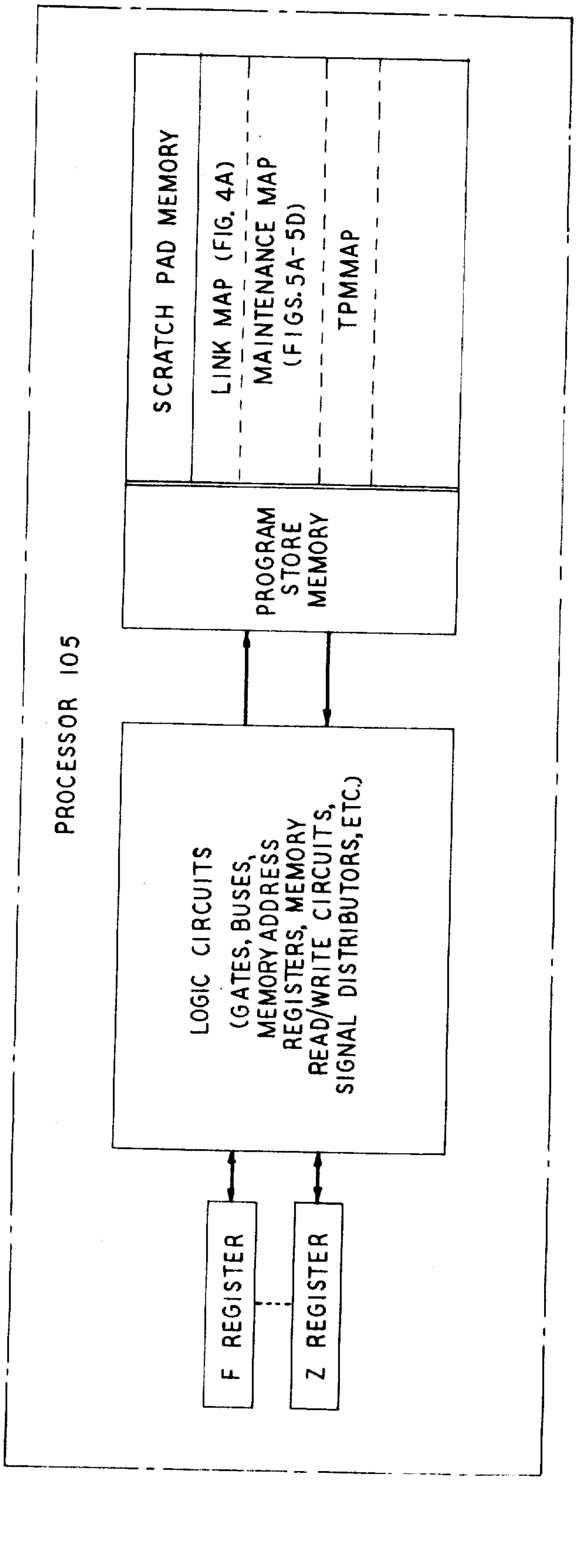
FIG. 2 is a more detailed block diagram of a stored program processor of the system in FIG. 1; states. a FIGS. 3A and 3B, with FIG. 3A being placed to the left of FIG. 0B, illustrate the layout of the trunk and position grids of the switching network of the system depicted in FIG. 1.

For the purpose of this discussion, a stored program controlled processor used as processor 105, FIG. 1, is shown in block diagram form in FIG. 2. This processor is described in U.S. Pat. No. 3,370,274, which issued on Feb. 20, 1968 to A. W. Kettley et al. Other processors may be used in applying the principles of this invention, if appropriate changes are made to account for a different memory layout and order word structure. The details of the operation of the internal logic of the processor depicted in FIG. 2 will not be completely described herein since only a description of the overall operation of this processor as it relates to this invention is necessary for a complete understanding of this invention.

Switching Network (FIGS. 1, 3A, 3B, 3C)

Referring back to switching network 104, FIG. 1, links 104A is composed of trunk links (A-links), position links (C-links) and junctors (B-links) connecting the A-links to the C-links. A path from the trunk to a position comprises an A-link, a B-link, and a C-link. All the trunk links taken together comprise the trunk link network (TLN) on which the first two stages of switching are performed. Network TLN connects trunk terminals to junctors and trunk-to-junctor concentration is performed in the first stage. The position link network (PLN) contains the C-links on which the second two stages of switching are performed. It connects junctors to the position and service circuit terminals and junctor-to-position and service circuit concentration is performed in the last switching stage. The junctors provide full access between trunk terminals and position and service circuit terminals.

Figure 3A:
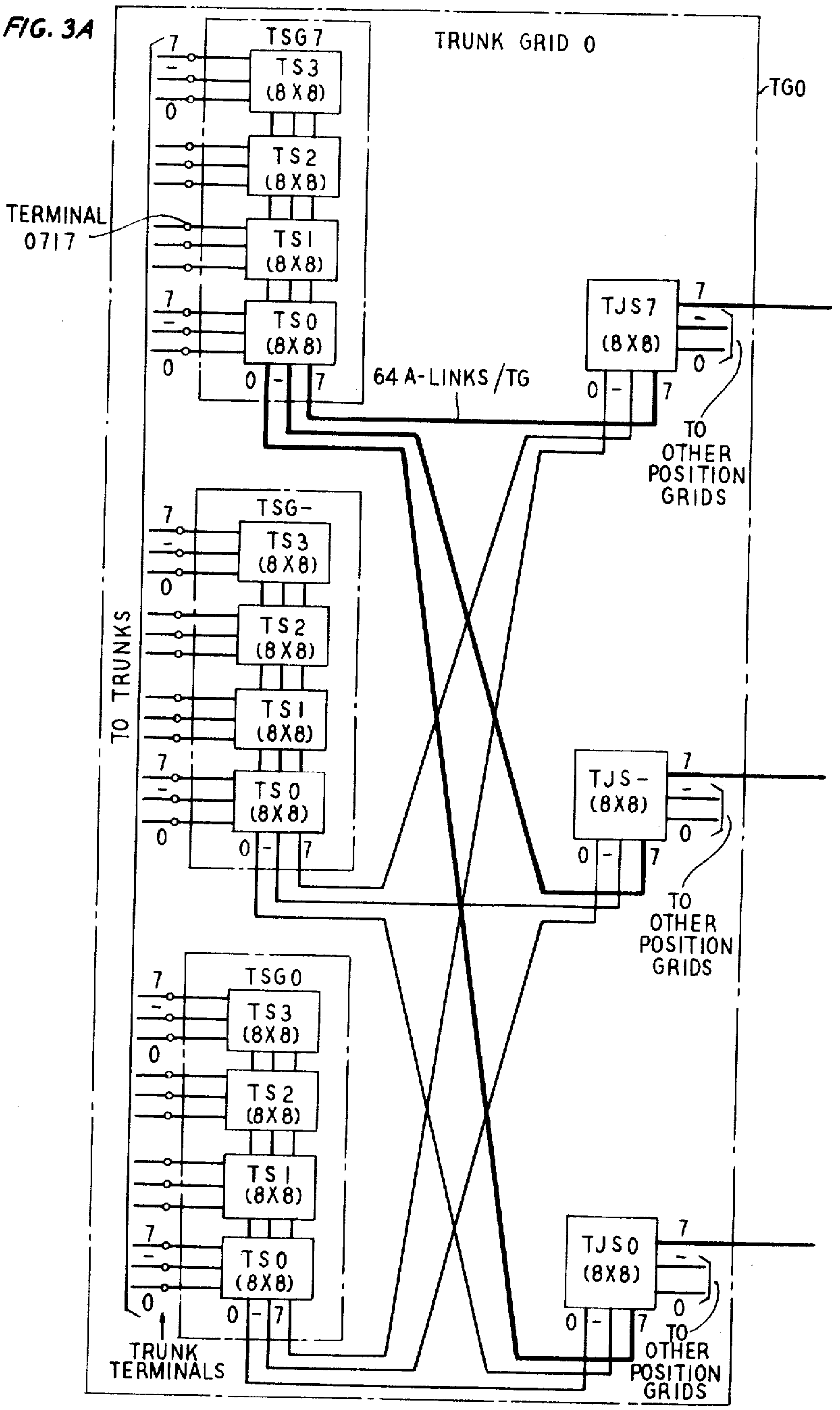
FIG. 3C illustrates the junctor distribution in the switching network of FIG. 1.

Network TLN consists of eight trunk grids (TG0–TG7), the layout of trunk grid TG0 being shown in FIG. 3A. Each trunk grid consists of eight trunk switch groups (TSG0–TSG8), providing the first stage of switching, and eight trunk junctor switches (TJS0–TJS7), providing the second stage of switching. 64 A-links in a trunk grid connect the eight trunk switch groups to the eight trunk junctor switches. A trunk switch group consists of four 8 × 8 trunk switches (TS0–TS3) multiplied so as to form a 32 × 8 switch. A trunk junctor switch consists of an 8 × 8 switch connected on one side to A-links and on the other side to B-links. The eight trunk junctor switches of a grid therefore provide 64 junctor terminals.

Figure 3B:
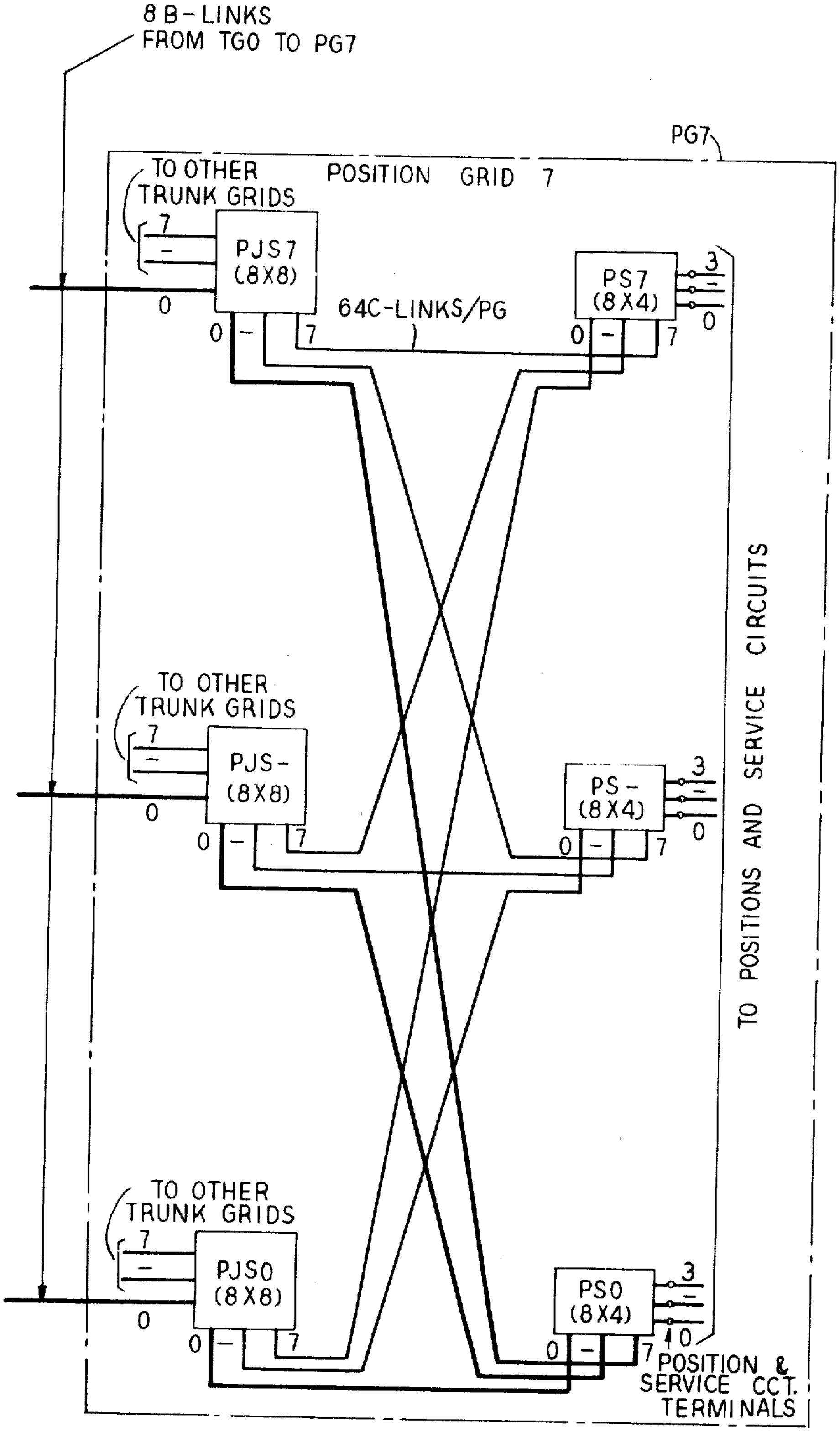
Figure 3C:
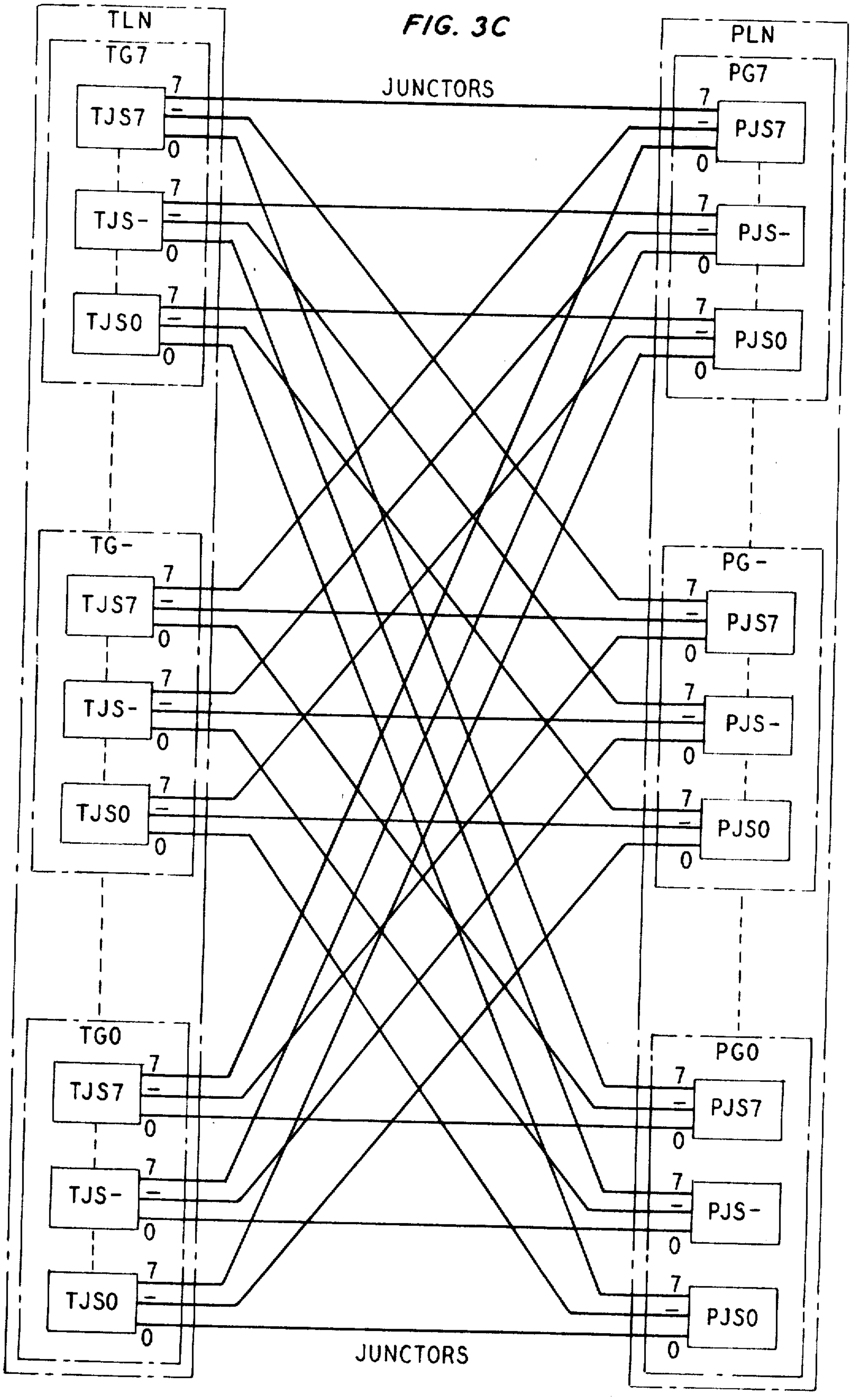

FIG. 3B shows the layout of position grid PG7. Eight of these position grids make up the position link network PLN. Each position grid consists of eight position junctor switches (PJS0–PJS7) providing the third stage of switching an eight position switches (PS0–PS7) providing the fourth and last stage of switching. The position switches are 8 × 4 switches and provide concentration between 64 C-links and the 32 position terminations of a position grid. The position junctor switches are 8 × 8 switches and permit the connection of the 64 junctor terminals of a position grid to the C-links. The heavy lines in FIGS. 3A and 3B show the access pattern between a trunk switch group and a position switch. It is thus seen that there are eight channels between any trunk and any position or service circuit.

3C shows the distribution of the 512 junctors (8 grids TG0–TG7 per TLN × 64 junctors per grid) connecting network TLN with network PLN. The junctor from each trunk junctor switch connects to identically numbered position junctor switches and the output level at the trunk junctor switch end specifies the number of the position grid at the position junctor switch end. Conversely, the junctors from each position junctor switch connect to identically numbered trunk junctor switches and the input level at the position junctor switch specifies the number of the trunk grid at the trunk junctor switch end. Since there are eight junctor switches on a grid, a trunk grid and a position grid are connected by eight junctors.

Each terminal at the trunk side or position side of the network is uniquely identified by a number that specifies its location. The location of a trunk terminal is specified by the trunk terminal number (TTN) which is an 11-bit binary number: TTN = $X_{10}X_{98}X_7X_6X_5X_4X_3X_2X_1X_0$. This binary number is broken down into four segments: TG ($X_{10}X_9X_8$), TSG ($X_7X_6X_5$), TS ($X_4X_3$), TL ($X_2X_1X_0$). TG specifies one of eight trunk grids, TSG one of eight trunk switch groups, TS one of four trunk switches, and TL one of eight terminal levels on a trunk switch. For example, terminal 0717 is specified by $TTN_{0717}$ = 00011101111 and is located on trunk grid 0, trunk switch group 7, trunk switch 1, at terminal level 7. Similarly, the location of a position terminal is specified by a position terminal number (PTN) which is an 8-bit binary number: PTN = $Y_7Y_6Y_5Y_4Y_3Y_2Y_1Y_0$. This binary number is comprised of three groups of bits: PG ($Y_7Y_6Y_5$), PS ($Y_4Y_3Y_2$), PL ($Y_1Y_0$). PG specifies one of eight position grids, PS one of eight position switches, and PL one of four terminal levels on a position switch.

Link Map (FIGS. 4A, 4B)

In order for processor 105 to set up a path through switching network 104, it is necessary to know the state (busy or idle) of all the links in the access pattern between the terminals desired to be connected together. A record of the state of all the links in switching network 104 is kept in an area of the scratch pad memory of the processor of FIG. 2, this area being known as the link map. Every link of the switching network is assigned a bit in the link map. If a link is idle its bit has a value of "1," and if it is busy its value is "0." When the processor seizes or releases a path through the switching network, the link map must be updated by busying or idling the bits in the link map corresponding to the links making up the path. The link map therefore shows the present state of links 104A, but contains no information as to how these links are connected into paths. This connection information is kept in another storage area, known as the network path memory. A programmer skilled in the art is capable of setting up a memory area as a network path memory so the network path memory will not be described since its description is not necessary for an understanding of the present invention.

The link map is organized so that when processor 105 determines the trunk terminal number and the position terminal number of the terminals to be connected or disconnected, either from teletypewriter 106 or during call processing, parts of those numbers point to words in the link map that represent the state of the links contained in the access pattern between the given terminals. Since a trunk terminal has access to eight A-links, a position terminal has access to eight C-links, and a trunk grid is connected to a position grid by eight B-links, 8-bit busy-idle words are used to store the state of each 8 link set. Furthermore, since there are 64 trunk switch groups in the trunk link network, every trunk switch group being connected to eight A-links, 64 position switches in the position link network, each connected to eight C-links, and 64 possible trunk grid-position grid pairs in the TLN–PLN pair with each pair of grids connected by eight B-links, it follows that the map can be subdivided into subtables of sixty-four 8-bit busy-idle words.

The memory of the processor of FIG. 2 is divided into 20-bit words. Therefore, for reasons of storage economy, two 8-bit busy-idle words are packed into a single 20-bit memory word so that a subtable requires 32 20-bit words. The busy-idle bits occupy bits 0 through 7 and bits 10 through 17. Thus, the link map consists of 96 20-bit words subdivided into three subtables, each subtable containing 32 20-bit words. These subtables are the A-link table, the B-link table, and the C-link table.

FIG. 4A illustrates the addressing technique for the link map and FIG. 4B illustrates the layout of a typical word in the link map. The following discussion describes this addressing and layout.

The A-link table stores the states of the 512 A-links of the trunk link network in 64 8-bit busy-idle words. It consists of the first 32 20-bit words of the link map, each word containing two 8-bit A-link busy-idle words (ALBIW). Each ALBIW represents the eight A-links connected to a particular trunk switch group. Since all terminals of a trunk switch group have access to the same links, only the TG and TSG ($X_{10}$–$X_5$) portion of a trunk terminal number is relevant to the location of an ALBIW in the link map. Two segments of $X_{10}$–$X_5$ are used as parameters of the location:

A. $X_9$ - $X_5$ is used as an index into the A-link table, pointing to a 20-bit word containing two ALBIWs; and B. $X_{10}$ discriminates between the two ALBIWs.

If $X_{10} = 0$ (for TG No. 0–TG No. 3), the ALBIW is in bits 0 through 7 and if $X_{10} = 1$ (for TG No. 4–TG No. 7) the ALBIW is in bits 10 through 17.

The C-link table stores the state of the 512 C-links of the position link network. It consists of the second set of 32 20-bit words of he link map, each word containing two 8-bit C-link busy-idle words (CLBIW). Each CLBIW is associated with a particular position switch in the position link network. The PG and PS ($Y_7$–$Y_2$) portion of a position terminal number determines the location of the CLBIW in the link map. In order to determine the location of the CLBIW in the link map, 32 must be added to the address of the beginning of the link map to obtain the address of the beginning of the C-link table, the link map beginning at the address symbolically designated N2LMAD. Two segments of $Y_7$–$Y_2$ are used as parameters to obtain the location of the CLBIW in the C-links table;

A. $Y_6$–$Y_2$ is used as an index to the C-link table, pointing to a 20-bit word containing two CLBIWs; and B. $Y_7$ discriminates between the two CLBIWs. If $Y_7 = 0$ (for PG No. 0–PG No. 3), the CLBIW is in bits 0 through 7 and if $Y_7 = 1$ (for PG No. 4–PG No. 7) the CLBIW is in bits 10 through 17.

The B-link table stores the state of the 512 B-links which connect the trunk link network to the position line network. It consists of the third set of 32 20-bit words of the link map, each word containing two 8-bit B-link busy-idle words (BLBIW) representing the eight links that connect a trunk grid in the trunk link network to a position grid in the position link network. The start of the B-link table is obtained by adding 64 to the start of the link map, N2LMAD. The parameters of the location of a BLBIW in the link map can be extracted from TG and PG as follows:

A. $X_9X_8X_7X_6X_5$ (the five least significant bits of TG, PG) are used as an index into the B-link table and point to a 20-bit word containing two BLBIWs; and B. $X_{10}$ discriminates between the two BLBIWs. If $X_{10} = 0$ (TG No. 0–TG No. 3), the BLBIW is in bits 0 through 7 and if $X_{10} = 1$ (TG No. 4–TG No. 7) the BLBIW is in bits 10 through 17.

The layout of a typical link map word is shown in FIG. 4B. In this word the bits labeled "A" are the bits used to represent the busy or idle condition of links. The bits labeled "B" and "C" are used for the purposes of the present invention and will be described in detail below.

Path Hunt

In order to relate the above description of the link map addressing scheme to the use of the link map, a discussion of the method by which the processor finds an idle A, B, and C-link combination for forming an idle path between a trunk terminal and a position terminal will be given. This procedure is known as path hunting and it is all based on THE numbers identifying the trunk and position terminals. It may be recalled that there is a set of eight A-links connecting the trunk switch group on which the trunk terminal is located to the eight trunk junctor switches on the trunk grid. There is also a set of eight C-links connecting the position switch on which the position terminal is located to the eight position junctor switches on the position grid. Furthermore, a set of eight B-links connects the eight trunk junctor switches on the trunk grid to the eight position junctor switches on the position grid. Therefore, there is a maximum of eight idle paths (channels) between a pair of terminals. These eight channels are shown in heavy lines in FIGS. 3A and 3B. A connection between a trunk terminal and a position terminal is possible if one or more sets of matching (connected to equally numbered junctor switches) A, B, and C-links within the access pattern are in the idle state.

To find an idle path between a trunk terminal and a position terminal the processor must perform the following steps:

1. Obtain the TTN = $X_{10}$–$X_0$ and the PTN = $Y_7$–$Y_0$ of the terminals.
2. Read the word at link map address N2LMAD + ($X_9X_8X_7X_6X_{510}$ to select the proper ALBIW.
3. Read the word at link map address N2LMAD + 32 + ($Y_6Y_5Y_4Y_3Y_2$) and use $Y_7$ to select the proper CLBIW.
4. Read the word at link map address N2LMAD + 64 + ($X_9X_8Y_7Y_6Y_5$) and use $X_{10}$ to select the proper BLBIW.

An idle path exists if a matching bit position in the busy-idle words previously obtained all contain "1." Therefore, the next steps in the path hunting procedure are:

5. Perform the logical product of ALBIW, BLBIW and CLBIW to obtain the channel busy-idle word. 6. Test if the channel busy-idle word is all zeros.
7. If the channel busy-idle word is all zeros, there is no idle path between the given trunk and position terminals. If the channel busy-idle word contains one or more ones, the position within the channel busy-idle word of the rightmost "1" is determined to select the channel to be used.
8. At the bit position previously determined, a "0" is written in the ALBIW, BLBIW, and CLBIW in the link map. Thus, the chosen links are seized and busied in memory, thereby preventing other path hunts from seizing them again. Note that the bit position (channel number indicates the trunk junctor switch and position junctor switch number used in the selected channel.

Maintenance Map FIGS. 5A, 5B, 5C, 5D)

An area of the scratch pad memory of processor 105, FIG. 2, is set aside as a maintenance map to store data for maintenance busy links. This maintenance map is divided into eight cells numbered 0 through 7. The cell number is referred to as the cell index. At any given time, a particular cell will be associated with, at most, one request. FIGS. 5A through 5D show the layout of the maintenance map. It is seen that there are four tables divided among the eight cells. The first table, FIG. 5A, comprising two words per cell and beginning at the symbolic address N8CELL, contains information about the type of maintenance request associated with the respective cells. If the request called for the processor to busy a link, then bit A of the cell associated with this request would contain a "1" if the request specified that a B-link was to be busied, and bit B would contain a "1" if it was specified that either an A or a C-link were to be busied. Bits A and B would both contain "1s"if the request involved either an A and C-link or a B- and C-link combination. If the request involved a junctor switch, bits A and B would both be "0." Bit C would be "0" if the request involved the trunk link network and would be "1" if the request involved the position link network. Bits D specify which of the eight channels is involved in the request. Bits, E, F, G, and H contain the trunk terminal number: Bits H specifying the trunk grid, bits G specifying the trunk switch group, bits F specifying the trunk switch, and bits E specifying the terminal level. Similarly, bits O, P, and Q contain the position terminal number; bits Q specifying the position grid, bits P specifying the position switch, and bits O specifying the terminal level. Bits J, K, and L contain the cell status, being used to mark the progress of the request, that is, whether all of the links requested have been busied. A description of the actual use of these bits J, K, and L is not necessary for an understanding of the principles of this invention. Bit N is an activity bit and is set to "1" when the cell is in active use for a request and is set to "0" when the cell is available to handle a request.

Figure 5A:
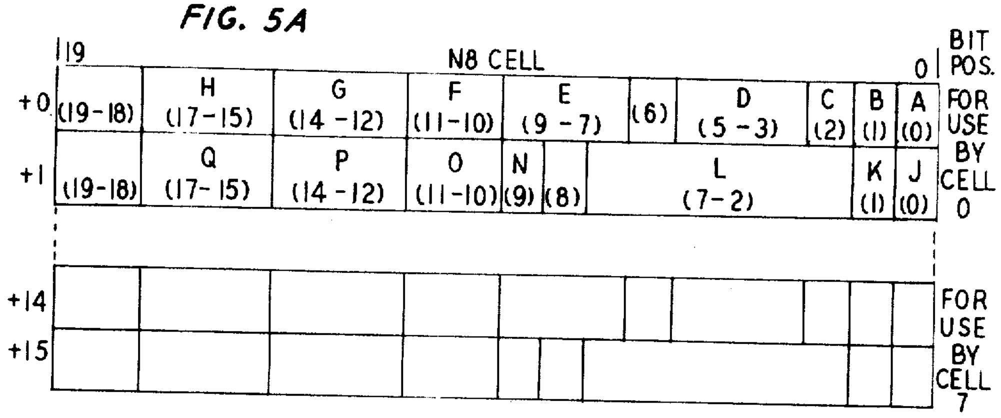
Figure 5B:
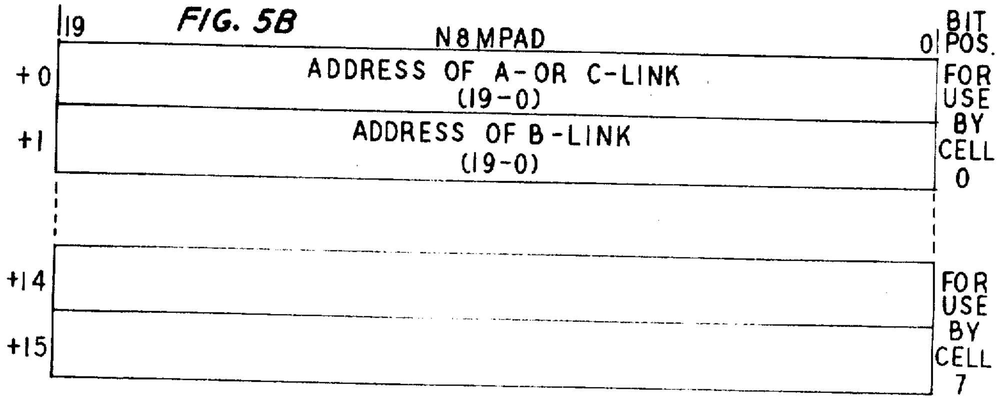
Figure 5C:
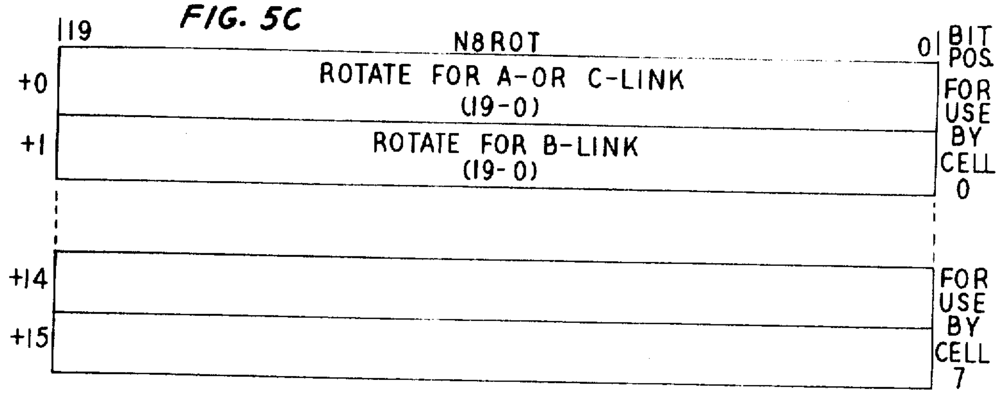
Figure 5D:
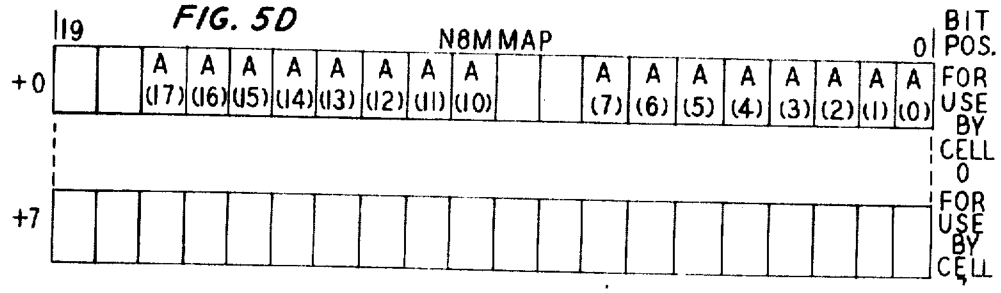

The second table, FIG. 5B, comprising two words per cell and beginning at the symbolic address N8MPAD, contains the link map address of the links involved in the particular request associated with each of the cells. The third table, FIG. 5C, also comprising two words per cell and beginning at the symbolic address N8ROT, contains the bit number in the link map word corresponding to the link which is the subject of the maintenance request. The fourth table, FIG. 5D, beginning at the symbolic address N8MMAP with one word per cell, indicates to the audit program which links are currently busied for maintenance purposes.

Maintenance Request

Figure 6:
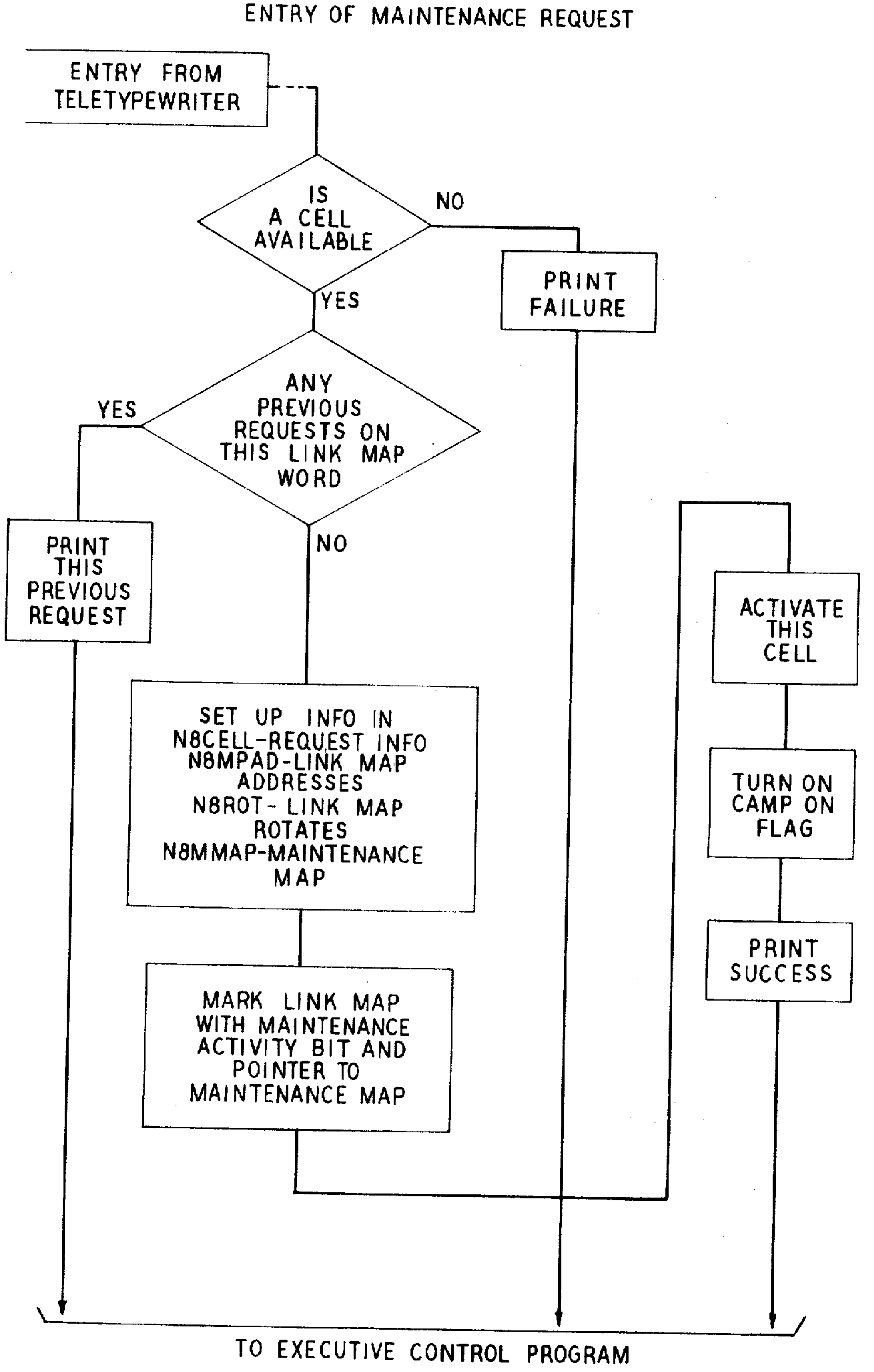

When a maintenance man desires to busy a particular link or combination of links in switching network 104, he types in a request via teletypewriter 106 of FIG. 1 to processor 105. The teletypewriter message contains information as to the type of request and the links involved, A description of the format of this message is not necessary for an understanding of the present invention and will not be described herein. FIG. 6 shows an overall functional flow chart of a program which causes processor 105 to respond to the request and perform the desired result. The processor is under the general control of an executive control program which serves to coordinate the activities of the processor and causes the operation of different programs at different times, depending upon which programs are required to control the processor at any different time. The instant invention is only concerned with one of these programs, called a network tests program.

When the executive control program recognizes a teletypewriter request for a maintenance function, it transfers control of the processor to the network tests program whose functional flow chart is shown in FIG. 6. The first action that the network tests program performs is a check to see whether or not a cell is available. This is done by examining bit N in the maintenance map table beginning at N8CELL for all eight cells. If all eight cells are busy with request, as shown by this bit being "1" for all cells, the network tests program causes a failure indication to be printed on the teletypewriter and then transfers control back to the executive control program. If a cell is available, because one of the bits N is "0," the network tests program then checks bit position 19 of the link map word corresponding to the link involved in the request. If this bit is set to "1" this indicates that there is a previous maintenance request on this link map word. In such a case, the network tests program will go back to the maintenance map cell corresponding to this link map word, in a manner to be described below, and will print the previous request on the teletypewriter. Control will then be transferred to the executive control program. If bit position 19 in the link map word contains a "0," this indicates that there is not previous maintenance request for that link map word.

The network tests program will then set up the maintenance map cell previously found to be available. In the table beginning at N8CELL the network tests program will store, in the words assigned to the available cell, the request information. In the table beginning at N8MPAD the link map address will be stored, In the table beginning at N8ROT the network tests program will store the bit position number in the link map word which corresponds to the link associated with this request. In the table beginning at N8MMAP the network tests program will put a "1" in the bit position corresponding to the bit position in the link map word which corresponds to the link which is being maintenance busied. The network tests program will next mark that bit position in the link map word to indicate that this link is busy. It will also place a "1 " in bit position 19 of the link map word to indicate that a link whose state is stored in this word has been made maintenance busy. Furthermore, the network tests program will mark bits 18, 9, and 8 with a 3-bit cell index which points to the cell in the maintenance map which is being used for this maintenance request. Bit N of this cell, FIG. 5A, is then marked with a "1" to indicate that this cell is presently handling a maintenance request.

The network test program then sets a particular bit in the processor's memory which is used by the executive control program as a flag so that the executive control program transfers control at regular intervals to a program which causes the processor to attempt to complete maintenance requests. This latter program is referred to as the "camp-on" program and the particular bit is called the camp-on flag. The camp-on program will be described later with respect to FIG. 8. After turning on the camp-on flag, the network tests program causes a success indication to be printed on the teletypewriter and returns control of the processor to the executive control program.

The Audit Procedure

As was previously mentioned, an audit program checks the link map with the network path memory. This is accomplished by forming, from the network path memory, words which are comparable to the link map words. These words are then compared with the corresponding link map words. If the audit program discovers a discrepancy, bit 19 of the link map word is examined. If this bit is set, the audit program examines bits 18, 9, and 8 of the link map word to determine the cell involved in the maintenance request. The audit program uses this cell index to look at a word in the table beginning at N8MMAP, FIG. 5D. The audit program then performs the logical union of this word with the link map word it formed from the network path memory and compares this combined word with the link map word. If the discrepancy disappears, then the audit program recognizes that the discrepancy was caused by a maintenance request. If the discrepancy still exists, the audit program replaces the link map word with the combined word.

Detailed Description

The following discussion will be concerned with the flow charts shown in FIGS. 7 through 13. From these flow charts and a knowledge of the order structure of the processor, as disclosed in the aforementioned Kettley et al. patent, a programmer skilled in the art will be able to properly code programs which will cause the processor to operate in accordance with the principles of the present invention.

Referring now to FIGS. 7A through 7C, there is shown therein a flow chart of part of the network tests program which causes the processor to respond to a request to remove links from service and place them in a maintenance busy condition. When the processor recognizes a request from the teletypewriter to busy a portion of the network, the processor first checks if there is an idle cell. This is done by examining bit N in the table beginning at N8CELL. If all eight bits N are "1," this means that all cells are presently handling requests and the processor will then cause a failure indication to be printed on the teletypewriter In the event that the processor finds a bit N to be "0," the processor then loads that cell with the request information and stores the cell index in the F register of the processor. The processor then places "0s" in the word in the table beginning at N8MMAP corresponding to this cell. In the processor scratch pad memory, FIG. 2, a word is set aside as a scratch pad for the network tests program. This word is designated TPMMAP, and is also zeroed at this time.

The processor then examines the request to determine what type of action is to be taken. There are eight types of requests, four for the trunk link network and four for the position link network. For the trunk link network there may be a request to busy a trunk junctor switch, a B-link, an A-link, or both an A and a B-link. Similarly, for the position link network the request may be to busy a position junctor switch, a B-link, a C-link, or both a B and a C-link. Note that in order to busy a junctor switch all of the A or C-links connected to this switch must be busied.

To illustrate the principles of the present invention without unduly complicating the discussion, the flow chart of FIGS. 7A, 7B, and 7C will be followed for the case in which the request was to busy a C-link in the position link network. An understanding of the steps involved in the processor response to the request is sufficient for an understanding of the steps involved in the response to other types of requests.

When the processor recognizes a request to busy a C-link in the position link network, it branches to the subroutine entitled CMAP. The flow chart of this subroutine is shown in FIG. 11B. The subroutine first obtains the start of the C-link map by adding 32 to N2LMAD. It then adds $Y_6Y_5Y_4Y_3Y_2$ of the position terminal number to obtain the address of the link map word corresponding to this link. It will be recalled that the cell index of the cell handling this request had previously been stored in the F register of the processor. The obtained address of the link map word is then stored in the cell of the address obtained by adding the contents of the F register to N8MPAD. The position of the bit in the link map word corresponding to the requested link is converted into a binary number designated ROTATE. ROTATE is then stored in the cell at the address obtained by adding the contents of the F register (the cell index) to N8ROT. Using ROTATE, the processor then forms a word in TPMMAP which is all "0s" except for a "1" in the position whose binary number is ROTATE. The subroutine then returns control of the processor to the main network tests program of FIG. 7A. This subroutine transfer is done in a manner known to a skilled programmer. The program then transfers to LINKAC, FIG. 7C, and then to subroutine CKMPAC, FIG. 12. This subroutine checks the link map word to see if there are previous maintenance request on this link map word. If so, the cell handling the request, the blocking cell, is printed on the teletypewriter. If there are no requests on the link map word, the CKMPAC subroutine then transfers control of the processor back to the main program which transfers to LINK, FIG. 7B. Control is then transferred to subroutine INMPL, FIG. 13. The INMPL subroutine marks the link map to indicate that the requested link is busy. It also places a "1" in bit position 19 of the link map word and places the cell index obtained from the F register, into bit positions 18, 9, and 8. Control is then transferred back to the main network tests program which activates the cell by placing a "1" in bit N, sets the camp-on flag, and causes a success indication to be printed on the teletypewriter.

The foregoing discussion has been for the case of a request concerned with only one link. If an entire junctor switch is to be busied, then the subroutines which check the link map for previous requests (CKMPSW, FIG. 12) and initialize the map (INMPSW, FIG. 13) must repeat certain operations in order to busy all of the A or C-links connected to the particular switch. A skilled programmer will do this by providing loops in the program. Note that all of the A or C-links connected to a particular junctor switch all have the same bit position in their respective link map words so that ROTATE remains the same for all of these links.

FIG. 8 shows a flow chart of the camp-on program portion of the network tests program. The camp-on program causes the processor to regularly attempt to complete maintenance requests whenever the camp-on flag is set. As was previously mentioned, bits J, K, and L of the words in the table beginning at N8CELL contain information indicative of the status of the cell. The camp-on program checks each cell to see whether it is active and needs work in order to comply with a request. A cell may require work because a requested link may have previously been busy for communication purposes. If it is found that an active cell needs work, the camp-om program transfers control to the DOCL subroutine, FIG. 10A. The operation of subroutine DOCL is evident from the flow chart of FIGS. 10A through 10C and a skilled programmer could routinely code the actual subroutine program. The camp-on program causes the tele-typewriter to print a cell whenever the request handled by the cell is fully complied with. It is seen from FIG. 8 that the camp-on program cycles through all the cells whenever the camp-on flag is set.

The flow chart of FIG. 9 is descriptive of a program which responds to a request to restore links to regular service. The restoration request is received over the teletypwriter and contains the cell number. This program sets a restore flag and transfers control to the DOCL subroutine, FIG. 10A. After restored to normal service the program of FIG. 9 zeros the cell and causes the teletypewriter to print a success message. It then transfers control to the executive control program.

Accordingly, a method has been shown whereby a record of maintenance busy links may be kept in the memory of a processor controlling a switching system while allowing an audit program to efficiently check the accuracy of network connection records stored in the memory.

What is claimed is:

1. A system including
a plurality of circuit elements selectively available for a plurality of service tasks and a certain other task,
a first memory area storing prescribed indication representing availability data for said elements,
means for reserving one of said elements for said certain other task,
a second memory area storing which of said elements are reserved for said certain other task, and
means responsive to a certain other task reservation condition of said one element for marking said first memory area with a prescribed indication for said one element and an index of a location in said second memory area storing certain other task reservation data for said one element.

2. The system of claim 1 further including means responsive to said certain other task reservation condition of said one element for marking said second memory area with an address of a location in said first memory area storing availability data for said one element.

3. The system of claim 2 further including
means comparing service task busy conditions of said circuit elements with said prescribed indications stored in said first memory area,
means responsive to a comparison for recognizing in said first memory area a prescribed indication for an element which is not service task busy, and
means responsive to said index and activated by said recognizing means for examining said second memory area to determine a certain other task reservation condition for said element which is not service task busy.

4. A communications system comprising
a plurality of links selectively available for communication paths and maintenance paths,
a first memory area storing availability data for said links,
audit means periodically comparing busy conditions of said links used for communication paths with stored availability data including means responsive to a comparison for recognizing in said first memory area a busy condition of a link excluded from a communication path, and
a second memory area storing which of said links are reserved for maintenance paths,
characterized by
means responsive to a maintenance reservation condition of one of said links for marking said first memory area with an index of the location in said second memory area storing maintenance reservation data for said one link, and
means controlled by said index and activated by said recognizing means for examining said second memory area to determine an actual maintenance reservation condition of said link.

5. In a telephone switching system having a switching network including a plurality of links for establishing connections among trunk circuits, operator positions, and functional service circuits, a processor for controlling said links for establishing said connections for maintenance and communication services, a scratch pad memory having a link map for recording busy-idle data for said links and a maintenance map for recording reservation data of said links for maintenance services,
the invention comprising
means for addressing said maintenance map to record maintenance reservation data for prescribed ones of said links,
means responsive to said maintenance map addressing for controlling said link map to record busy data for said prescribed links, and
means for recording in said link map index data of maintenance map addresses, for said prescribed links.

6. In a telephone system, the invention according to claim 5 wherein said link map comprises a plurality of words corresponding to said links in a predetermined fixed format, said maintenance map includes a plurality of numbered cells each selectively associable with a word of said link map when one of said prescribed links whose busy-idle data is recorded in said word is maintenance reserved, each of said cells recording maintenance reservation data for the prescribed links corresponding to the words associated with said each of said cells, and said index data includes the number of the one of said cells associated with said word.

7. In a telephone system, the invention according to claim 6 further comprising means responsive to said map addressing for recording in said word of said link map flag data indicative of a maintenance reservation for said prescribed links.

8. In a telephone system, the invention according to claim 7 further comprising
means periodically comparing states of links busy in communication service connections with busy-idle data recorded in said link map,
means responsive to a comparison for recognizing in said link map a busy link not in communication service connection,
means activated by said recognizing means for examining said flag data to determine a maintenance reservation condition of a link whose busy-idle data is recorded in said word containing said flag data, and
means activated by said examining means and responsive to the presence of said flag data for examining an associated cell in accordance with said index data to determine an actual maintenance reservation condition of said busy link.

9. In a telephone system, the invention according to claim 8 further comprising means responsive to flag data in one of said words for inhibiting maintenance reservations for the links corresponding to said one word.

10. In a telephone system, the invention according to claim 9 further comprising means responsive to a communication busy condition of one of said links for inhibiting a maintenance reservation for said one link until said one link communication busy condition is terminated.

11. A method for controlling apparatus to mark a processor memory to indicate a maintenance busy condition of one of a plurality of links in a switching system, wherein said links are controlled by said processor for connection into paths for both communication and maintenance purposes, and said processor memory includes a first area storing availability data for said links and a second area storing maintenance busy data for said links, comprising the apparatus steps of
recording in said first area of said memory busy data for said one link,
recording in said second area of said memory maintenance busy data for said one link, and recording in said first area of said memory at the location containing busy data for said one link the address in said second area of said memory containing said maintenance busy data for said one link.

12. The method of claim 11 comprising the step of recording in said second area of said memory at the location containing said maintenance busy data for said one link the address in said first area of said memory containing said busy data for said one link.

* * * * *